United States Patent [19]

Bottorff

[11] Patent Number: 5,853,542

[45] Date of Patent: Dec. 29, 1998

[54] METHOD OF SIZING PAPER USING A SIZING AGENT AND A POLYMERIC ENHANCER AND PAPER PRODUCED THEREOF

[75] Inventor: Kyle J. Bottorff, Newark, Del.

[73] Assignee: Hercules Incorporated, Wilmington, Del.

[21] Appl. No.: 526,812

[22] Filed: Sep. 11, 1995

[51] Int. Cl.⁶ .......................... D21H 17/45; D21H 17/72; D21H 23/76; D21H 21/16
[52] U.S. Cl. .................... 162/168.2; 162/158; 162/166
[58] Field of Search ............... 162/168.2, 168.1, 162/158, 166, 167

[56] References Cited

U.S. PATENT DOCUMENTS

| | | | |
|---|---|---|---|
| 3,840,486 | 10/1974 | Dumas | 260/29.4 R |
| 3,923,745 | 12/1975 | Dumas | 260/77.5 CR |
| 3,941,736 | 3/1976 | Aldrich | 260/29.6 NR |
| 3,957,574 | 5/1976 | Anderson | 162/167 |
| 4,240,935 | 12/1980 | Dumas | 260/9 |
| 4,279,794 | 7/1981 | Dumas | 260/29.2 EP |
| 4,295,931 | 10/1981 | Dumas | 162/158 |
| 4,317,756 | 3/1982 | Dumas | 524/607 |
| 4,347,339 | 8/1982 | Boevink et al. | 525/180 |
| 4,407,994 | 10/1983 | Bankert et al. | 524/107 |
| 4,478,682 | 10/1984 | Bankert et al. | 162/158 |
| 4,784,727 | 11/1988 | Schröer et al. | 162/158 |
| 4,810,254 | 3/1989 | Bauer et al. | 8/554 |
| 4,847,315 | 7/1989 | Hassler | 524/357 |
| 4,895,621 | 1/1990 | Hassler | 162/164.3 |
| 5,262,008 | 11/1993 | Moench et al. | 162/162.2 |
| 5,318,669 | 6/1994 | Dasgupta | 162/164 |
| 5,338,406 | 8/1994 | Smith | 162/168.2 |
| 5,338,407 | 8/1994 | Dasgupta | 162/168.3 |
| 5,382,324 | 1/1995 | Fischer et al. | 162/168.2 |
| 5,393,380 | 2/1995 | Reed et al. | 162/168.2 |

FOREIGN PATENT DOCUMENTS

| | | |
|---|---|---|
| 1286457 | 7/1991 | Canada . |
| 0 282 081 | 9/1988 | European Pat. Off. . |
| 0 320 512 - A1 | 6/1989 | European Pat. Off. . |
| 0 416 427 - A1 | 3/1991 | European Pat. Off. . |
| 0 058 622 | 8/1992 | European Pat. Off. . |
| 3635954 | 4/1987 | Germany . |
| 57-11288 | 1/1982 | Japan . |
| 57-161197 | 10/1982 | Japan . |
| 59-36788 | 2/1984 | Japan . |
| 60-59195 | 4/1985 | Japan . |
| 61-133213 | 6/1986 | Japan . |
| 05247883 A | 9/1993 | Japan . |
| 6-299494 | 10/1994 | Japan . |
| 07-082692 | 3/1995 | Japan . |
| 72012521 B | 3/1995 | Japan . |
| 2 141 751 - A | 1/1985 | United Kingdom . |

OTHER PUBLICATIONS

*Pulp and Paper –Chemistry and Chemical Technology,* 3rd Ed., vol. 2, James P. Casey, Ed., John Wiley & Sons, pp. 855–856 (1981).

*Pulp and Paper –Chemistry and Chemical Technology,* 3rd Ed., vol. 3, James P. Casey, Ed., John Wiley & Sons, pp. 1553–1554, 1888 (1981).

Raphael M. Ottenbrite et al., "Cyclopolymerization of N,N–Dialkyldiallylammonium Halides. A Review and Use Analysis," *Ind. Eng. Chem. Prod. Res. Dev.,* vol. 19, No. 4, pp. 528–532 (1980).

George B. Butler, "Copolymerization of Nonconjugated Dienes with Conventional Vinyl Monomers," *Cyclopolymerization and Cyclocopolymeriztion,* Chapter 7, Marcel Dekker, Inc., NY, pp. 239–277 (1992).

George B. Butler, "Practical Significance of Cyclopolymerization," *Cyclopolymerization and Cyclocopolymerization,* Chapter 12, Marcel Dekker, Inc., NY, pp. 484–536 (1992).

Tom Lindström et al., "On the Mechanism of Sizing with Alkylketene Dimers," *Nordic Pulp and Paper Research Journal,* vol. 1, No. 2, pp. 39–45 (1986).

Ian Thorn et al., "The Use of Cure Promoters in Alkaline Sizing," *Paper Technology,* pp. 41–45 (1993).

E. Poppel et al., "Recent Advances in Sizing and Filling of Paper," Translation of Zellstoff und Papier, vol. 37, No. 3, pp. 3–? (1988).

*Primary Examiner*—Stanley S. Silverman
*Assistant Examiner*—Jose A. Fortuna
*Attorney, Agent, or Firm*—Mark D. Kuller

[57] ABSTRACT

Paper sizing enhancer that is a polymerization reaction product of a quaternary diallylammonium monomer and a diallylammonium monomer, as well as compositions containing the sizing enhancer and a sizing agent. The method of sizing paper with such paper sizing enhancer compound and a sizing agent provides sized paper with significantly improved sizing property characteristics, and the sized paper exhibits high print quality when used in inkjet printing applications.

62 Claims, No Drawings

METHOD OF SIZING PAPER USING A SIZING AGENT AND A POLYMERIC ENHANCER AND PAPER PRODUCED THEREOF

FIELD OF THE INVENTION

This invention relates to paper sizing enhancer compounds, compositions containing paper sizing agents and the sizing enhancer compounds, methods of using the sizing enhancer compositions and paper made using the sizing enhancer compositions.

BACKGROUND OF THE INVENTION

In papermaking and paper finishing, a sizing agent is often employed to provide desirable characteristics sought in the ultimate paper product.

Sizing, or sizing property, is a measure of the resistance of a manufactured paper or paperboard product to the penetration or wetting by an aqueous liquid. Sizing agents are internal additives employed during papermaking or external additives employed as coating agents during paper finishing that increase this resistance Papermaking can be carried out under acidic or alkaline pH conditions, and the selection of a sizing agent is usually dependent on the pH used. For example, rosin-derived sizing agents are typically used under acidic papermaking conditions. Under alkaline pH conditions, which are becoming widely used in fine paper manufacturing applications, typical sizing agents include alkyl ketene or alkenyl dimers or acid anhydrides such as alkenyl succinic anhydrides.

The sizing properties provided by conventional paper sizing agents may be improved by the use of sizing enhancers, also called sizing accelerators or promoters. Numerous paper sizing enhancers are known; see, e.g., U.S. Pat. No. 3,840,486; U.S. Pat. No. 3,923,745; U.S. Pat. No. 3,957,574; U.S. Pat. No. 4,240,935; U.S. Pat. No. 4,279,794; U.S. Pat. No. 4,295,931; U.S. Pat. No. 4,317,756; U.S. Pat. No. 4,407,994; U.S. Pat. No. 4,478,682; U.S. Pat. No. 4,847,315; and U.S. Pat. No. 4,895,621, all of which are incorporated by reference.

Despite the beneficial sizing properties provided by these prior art paper sizing enhancers, there is still great demand for further improvement. Of particular interest are new sizing enhancers that would provide more rapid rate of development of the sizing property, once the sizing agent is applied to the paper, and that permit more efficient use of the sizing agent, by reducing the amount of sizing agent required to yield the desired sizing property.

The rate at which the sizing property develops in the sized paper is very important. The sizing property is advantageously developed as quickly as possible after the sizing agent has been added or applied. It is known that the level of size development increases as sized paper is dried to remove moisture. As the rate of size development is increased, the drying energy requirements ordinarily decrease for a given level of sizing. In papermaking processes where the sizing agent is added at the wet end of the paper machine, the sized paper is typically dried to about 0.8–2 wt % moisture to obtain adequate development of the sizing property before the paper reaches the size press; at the end of the size press treatment, the paper is typically dried to about 4–6 wt % moisture.

If the sizing property is not fully developed, corrective measures must be taken, e.g., the paper must be stored for sufficient time (hours or days) until the sizing property develops adequately for the intended use of the paper, or an excess of sizing agent must be used to provide adequate sizing property if the benefit is required (e.g., during the paper finishing or converting steps) before the sizing property has completely developed.

The efficiency of the sizing agent, i.e., the degree of sizing obtained per unit of size added, is likewise important Improved sizing agent efficiency results in improved papermaking economies. Excess sizing agent can adversely affect the paper handling characteristics and production efficiency during further converting operations performed on the paper (i.e., causing jams, misregisters, missed folds, sliding, slipping). Excess sizing can also result in significant decreases in the paper quality by creating deposits on the paper.

Various cationic polymers have been described in the prior art for use in papermaking, and some of these polymers have been used as paper sizing agents or paper sizing enhancers; see, e.g., German Patent 3,635,954, which is incorporated by reference.

Cationic polymers and copolymers based on the cyclopolymerization of dimethyldiallylammonium chloride are well known for use in a wide variety of industrial applications. A good review of such cationic polymers and their uses is Butler, "Practical Significance of Cyclopolymerization," Chapter 12 in Cyclopolymerization and Cyclocopolymerization, Marcel Dekker, Inc., New York, N.Y., pp. 485–536 (1992), which is incorporated by reference.

Poly(diallyldimethylammonium chloride) homopolymers are well known cationic polymeric compounds that have been used commercially in papermaking for a wide variety of purposes, e.g., for aiding furnish retention and additive retention in paper; for increasing the dewatering rate of wet paper web; for neutralizing anionic materials in white water; and for size enhancement, to improve paper sizing efficiency and its rate of development. Reten®203 retention aid (Hercules Incorporated, Wilmington, Del.), a product which contains a diallyldimethylammonium chloride homopolymer, is one such product.

Poly(diallylammonium chloride) homopolymers are also known cationic polymeric compounds that have been reported to be useful for various papermaking applications.

Copolymers and terpolymers containing diallylamine-type compounds, such as diallyldimethylammonium chloride (DADMAC) or diallylamine (also referred to as DAA), such as diallylammonium chloride (also referred to as DAA.HCl or DAAC), as one of the monomeric components are also known. Japanese Patent 57 161197, which is incorporated by reference, discloses use of copolymers of sulfur dioxide and diallyldialkylammonium salts, such as DADMAC, or diallylammonium salts, as a dispersing agent with a paper sizing agent. European Patent 282 081, which is incorporated by reference, discloses (meth)acrylamide terpolymers that also contain DADMAC or diallylamine, useful in combination with aluminum sulfate for increasing paper strength. Japanese Patent 52 47883, which is incorporated by reference, discloses copolymers of acrylamide and diallylamine-type compounds, useful for producing stronger paper. U.S. Pat. Nos. 4,279,794 and 4,295,931, which are incorporated by reference, disclose the use of poly(diallylamine) epihalohydrin resins as paper sizing accelerators. Japanese Patent 62 99494, which is incorporated by reference, discloses use of copolymers of diallylammonium salts and certain non-ionic water-soluble monomers (e.g. acrylamide) with a paper sizing agent to provide improved sizing property development.

Reports in the literature of copolymers containing DADMAC and DAAC are relatively isolated, especially when viewed in the context of the huge volume of literature concerning DADMAC-based polymers. Japanese Patent 57 011288, which is incorporated by reference, discloses a printing method for cellulose that utilizes a variety of diallyl-based homopolymers or copolymers of diallyldialkylammonium salts and diallylammonium salts, but the molecular weights of these water-soluble polymers are less than 10,000. Japanese Patent 61 133213, which is incorporated by reference, discloses copolymers useful in textile dying processes and exemplifies copolymers that are prepared from DADMAC and DAAC monomers; the disclosed copolymers have average molecular weights of 181,000 or less. Japanese Patent 59 036788, which is incorporated by reference, discloses a method for improving wet fastness in dyed cellulose textile fiber and exemplifies the use of homopolymers, copolymers or terpolymers that are made from any of several monomers which include diallyldimethylammonium salts. U.S. Pat. No. 4,347,339, which is incorporated by reference, discloses DADMAC and DAAC copolymers that are reacted with compounds such as epichlorohydrin or trichlorotriazine to make cationic block copolymers.

Despite the reported usefulness of diallyl-based cationic polymers for a variety of industrial purposes, there is no suggestion in the prior art of the usefulness of copolymers of diallyldialkylammonium salts and diallylammonium salts for improving the sizing property characteristics of sized paper.

SUMMARY OF THE INVENTION

One aspect of the present invention is a paper sizing enhancer that is a polymerization reaction product of at least one quaternary diallylammonium monomer and at least one diallylammonium monomer. A preferred paper sizing enhancer is a polymerization reaction product of a quaternary diallylammonium monomer of formula (I):

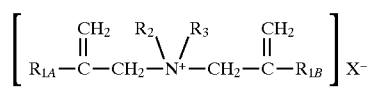

and a diallylammonium monomer of formula (II):

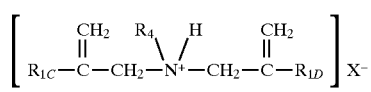

where $R_{1A}$, $R_{1B}$, $R_{1C}$ and $R_{1D}$ are independently hydrogen or $C_1$–$C_{22}$ straight chain or branched alkyl; $R_2$ and $R_3$ are independently alkyl, alkenyl, or aryl; $R_4$ is hydrogen, alkyl, alkenyl, or aryl; and $X^-$ is a monovalent anion or a multivalent equivalent of a monovalent anion.

Another aspect of the invention is a paper sizing composition comprising a paper sizing agent and the above-described paper sizing enhancer regarding the first aspect of this invention.

Still another aspect of the invention is a method of producing sized paper with enhanced sizing property characteristics by employing the paper sizing enhancer of this invention.

Yet another aspect of the invention is sized paper containing the paper sizing enhancer of this invention.

Among the benefits of the present invention, the sizing enhancers increase the efficiency of paper sizing agents and increase the rate at which the sizing property develops in paper when the sizing enhancers are used with sizing agents. Sized paper made with the sizing enhancer of this invention exhibits an accelerated rate of sizing property development, requires the use of less sizing agent, retains the sizing property longer than papers made without the sizing enhancer, and is particularly well suited for inkjet printing applications. Other benefits and advantages of the present invention will be apparent in view of this disclosure.

DETAILED DESCRIPTION OF THE PREFERRED EMBODIMENTS

The references in this specification to "paper" and "paper-making" are intended to cover not only paper (and its manufacture), but also paperboard, molded paper and other similar cellulosic-web based materials (and their manufacture), that are typically manufactured with paper-making equipment and procedures and that require additives such as sizing agents for modification of the sizing property of the resultant product.

The paper sizing enhancer of this invention is a polymerization reaction product prepared from at least one quaternary diallylammonium monomer and at least one diallylammonium monomer. The polymerization reaction product is preferably prepared from the monomers:

(i) quaternary diallylammonium monomer of formula (I),

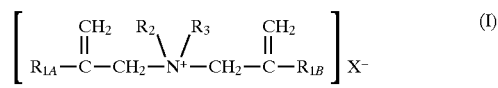

and (ii) diallylammonium monomer of formula (II)

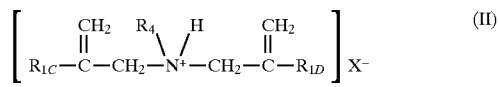

In formulas (I) and (II), the $R_1$ radicals $R_{1A}$, $R_{1B}$, $R_{1C}$ and $R_{1D}$ are each independently either hydrogen or methyl. The $R_1$ radicals are preferably hydrogen.

In formula (I), $R_2$ is alkyl, alkenyl or aryl, preferably $C_1$–$C_{22}$ alkyl, $C_1$–$C_{22}$ alkenyl, or $C_6$–$C_{10}$ aryl. Likewise, in formula (II), $R_3$ is alkyl, alkenyl or aryl, preferably $C_1$–$C_{22}$ alkyl, $C_1$–$C_{22}$ alkenyl, or $C_6$–$C_{10}$ aryl.

In formula (II), $R_4$ is hydrogen, alkyl, alkenyl or aryl, preferably hydrogen, $C_1$–$C_{22}$ alkyl, $C_1$–$C_{22}$ alkenyl, or $C_6$–$C_{10}$ aryl.

In formulas (I) and (II), the $R_2$, $R_3$ and $R_4$ radicals (other than hydrogen) may be unsubstituted or substituted, e.g., alkyl may be hydroxyalkyl, carboxy, alkoxy, mercapto or thio. Likewise, in formulas (I) and (II), the $R_2$, $R_3$ and $R_4$ alkyl radicals, alkenyl radicals and aryl radicals may include ester groups and may be interrupted by heteroatoms, e.g., N or S, or by heterogroups, e.g., —NH—CO— or —CO—NH—.

In formulas (I) and (II), the $R_2$, $R_3$ and $R_4$ alkyl radicals and alkenyl radicals may be straight chained or branched. The radicals $R_2$, $R_3$ and $R_4$ are preferably uninterrupted alkyl radicals with 1–18 carbon atoms, more preferably 1–4 carbon atoms.

Examples of suitable alkyl radicals for $R_2$, $R_3$ and/or $R_4$ are n-docosyl, n-pentadecyl, n-decyl, i-octyl, i-heptyl, n-hexyl, i-pentyl and, preferably, n-butyl, i-butyl, sec-butyl, i-propyl, ethyl and methyl. The radicals $R_2$, $R_3$ and $R_4$ are preferably identical and are preferably methyl.

Preferred alkenyl groups for the $R_2$, $R_3$ and $R_4$ radicals in formulas (I) and (II) include octadecenyl, hexadecenyl, undecenyl, octadec-dienyl, hexadec-dienyl, or mixtures of these. Preferred aryl groups for $R_2$, $R_3$ and $R_4$ radicals in formulas (I) and (II) include benzyl and phenyl.

In monomers of formula (I), the $R_2$ and $R_3$ radicals independently are preferably selected from, in decreasing order of preference: methyl, benzyl, $C_2$–$C_{18}$ alkyl, phenyl, octadec-dienyl or hexadec-dienyl, octadecenyl or hexadecenyl or undecenyl, and other alkyl and aryl.

In monomers of formula (II), the $R_4$ radical is preferably selected from, in decreasing order of preference: hydrogen, methyl, benzyl or phenyl, $C_2$–$C_{18}$ alkyl, octadec-dienyl or hexadec-dienyl, octadecenyl or hexadecenyl or undecenyl, and other alkyl and aryl.

In formulas (I) and (II), $X^-$ is a monovalent anion or a multivalent equivalent of a monovalent anion. Salts of inorganic acids and common organic acids may be used. Preferably, $X^-$ is selected from halide, nitrate, acetate, benzoate, sulfate or phosphate. Preferred halides are chloride, fluoride and bromide. More preferably, $X^-$ is chloride or fluoride.

More preferred monomers of formulas (I) and (II) are those in which $R_{1A}$, $R_{1B}$, $R_{1C}$ and $R_{1D}$ and $R_4$ are hydrogen and $R_2$ and $R_3$ are methyl. For such preferred monomers where $X^-$ is chloride, the monomer of formula (I) is diallyldimethylammonium chloride, sometimes referred to herein as DADMAC, and the monomer of formula (II) is diallylammonium chloride, sometimes referred to herein as DAA.HCl.

The polymeric reaction products of the polymerization of monomer of formula (I) and monomer of formula (II) preferably contain only these monomeric components in the polymer; they do not contain significant amounts of other monomeric components in addition to the formula (I) monomer and formula (II) monomer. The polymers may contain from about 1 mole % to about 99 mole % of the monomer of formula (I), the balance being substantially the monomer of formula (II)

Other monomeric components, however, may be present in addition to the formula (I) monomer and formula (II) monomer without adversely affecting the sizing enhancer properties of the polymerization reaction product.

In addition, more than one type or species of formula (I) monomer and/or of formula (II) monomer may be employed concurrently in the polymerization reaction.

Preferred compositions of the polymerization reaction products contain from about 20 mole % to about 98 mole % monomer of formula (I), the balance being substantially monomer of formula (II). More preferred compositions contain from about 60 mole % to about 95 mole % of monomer of formula (I), the balance being substantially monomer of formula (II); and the most preferred compositions contain from about 75 mole % to about 90 mole % monomer of formula (I), the balance being substantially monomer of formula (II).

The polymerization reaction products of this invention are water-soluble polymers that possess relatively high average molecular weights. The weight average molecular weight ($M_w$) for these polymers is at least about 10,000, more preferably at least about 50,000 and most preferably at least about 200,000 to about 1,000,000 or more. The performance of these polymers as size enhancers improves as their weight average molecular weight is increased above about 10,000. For this reason, weight average molecular weights of at least about 200,000 to about 1,000,000 or more are most preferred.

The monomeric components utilized for preparation of the polymerization reaction products of this invention are either known and are available commercially (e.g., DADMAC from CPS Chemical Company, Inc. (Old Bridge, N.J.) and from Pearl River Polymers (Pearl River, La.); DADMAC and DAA.HCl from Sigma Chemical Company (St. Louis, Mo.)) or may be prepared by conventional processes, typically used for the preparation of diallyl-type compounds.

The preparation of the polymeric reaction product is preferably carried out by the polymerization of the monomers of formulas (I) and (II) in the presence of a free radical polymerization initiator.

The polymerization reaction of the two diallyl-type monomer components is carried out in a suitable solvent, polar solvents being preferred. Water is a particularly preferred solvent for the polymerization reaction. Other polar solvents which do not adversely affect the polymerization reaction may also be used and include lower alcohols such as methanol, ethanol and isopropanol (i-propanol), t-butanol, acetone, formamide, dimethylformamide, dimethylsulfoxide, and the like. One factor to be considered in the selection of a suitable solvent is the potential for reaction between the initiator employed and the solvent, causing the polymerization reaction to be quenched Suitable solvents also include water mixed with a water-miscible solvent or solvents. Preferably, such water/water-miscible solvent combinations include up to 20% by weight of a water-miscible solvent. Suitable water-miscible solvents are, for example, lower alcohols, such as methanol, ethanol, n-propanol, i-propanol, n-butanol and t-butanol; glycols and diols, such as, for example, ethylene glycol, propylene glycol and 1,3-propanediol; di- and polyglycols, such as, for example, diethylene glycol and triethylene glycol; glycol ethers, such as, for example, diethylene glycol monomethyl ether, diethylene glycol monoethyl ether, ethylene glycol monomethyl ether, ethylene glycol monoethyl ether, ethylene glycol mono-n-propyl ether, ethylene glycol mono-n-butyl ether, ethylene glycol dimethyl ether and ethylene glycol diethyl ether; and ketones, such as, for example, acetone or methyl ethyl ketone. Water mixed with alcohols, in particular those with 1 to 4 carbon atoms, and water mixed with diols or glycols are preferred.

The amount of solvent used in the polymerization reaction medium is desirably minimized, to provide high concentrations of the monomers in the reaction medium. The lower limit for the amount of solvent is generally dictated by the need to obtain adequate mixing of the reaction medium throughout the polymerization reaction. Since the viscosity of the reaction medium normally increases as high molecular weight polymers are formed from the monomer components, it may be advantageous to add additional solvent during the course of the polymerization reaction to adjust the viscosity of the reaction medium.

Preferably, the concentration of monomeric reactants in the solvent is from about 20 to about 70 wt % and more preferably, from about 40 to about 70 wt %, based on the weight of the reaction medium.

Before the start of the polymerization, it is advantageous to adjust the pH of the reaction medium to bring the pH to a value of about 2 to about 8.5, and preferably, about 3 to about 6. An acid, preferably an inorganic acid such as a hydrohalo acid like HCl, is typically used for this adjustment of the pH.

The polymerization reaction temperature employed is normally based on the performance characteristics of the initiator used and is also dictated by the rate of polymerization and degree of polymerization (molecular weight) desired. The polymerization is typically carried out at a temperature of about 40° C. to about 100° C., preferably about 50° C. to about 95° C. and more preferably at a temperature of about 70° C. to about 90° C., at ambient pressure (one atmosphere). The polymerization reaction is ordinarily characterized by being very exothermic in its early stages. The polymerization may require from about 30 minutes to many hours, e.g., from about 2 to 30 hours, to ensure relatively complete reaction of the monomer components.

The polymerization reaction of the monomer components is started in the customary manner, typically by addition of a suitable initiator, preferably one that is water-soluble.

Preferably, ammonium persulfate, t-butyl hydroperoxide, 2,2'-azobis-(2-amidinopropane) dihydrochloride, 2,2'-azobis-(2-imidazol-2-yl-propane) dihydrochloride, 2,2'-azobis-(2-carbamoylpropane) dihydrate or 2,2'-azobis-(2-methoxycarbonylpropane) is used as the initiator.

Other suitable initiators, i.e., substances which form free radicals, include hydrogen peroxide, benzoyl peroxide, cumene hydroperoxide, methyl ethyl ketone peroxide, lauryl peroxide, t-butyl perbenzoate, di-t-butyl perphthalate, azobisisobutyronitrile, 2,2'-azobis-(2,4-dimethylvaleronitrile), 2-phenyl-azo-2,4-dimethyl-4-methoxyvaleronitrile, 2-cyano-2-propylazoformamide, azodiisobutyramide, dimethyl, diethyl or di-n-butyl azobismethylvalerate, t-butyl perneodecanoate, di-isononanoyl peroxide, t-amyl perpivalate, di-2-ethylhexyl peroxydicarbonate, dilauroyl peroxide, di-isotridecyl peroxydicarbonate, t-butyl peroxyisopropyl percarbonate. Combinations or mixtures of initiators may also be used.

About 0.01 to about 10% by weight, preferably about 0.1 to about 5% by weight, of initiator is used, based on the amount (weight) of the monomer components. It is advantageous to carry out the polymerization with the exclusion of oxygen, to minimize the amount of initiator used and to maximize the polymer molecular weight. This can be effected in a conventional manner, for example, by flushing or degassing with an inert gas, such as nitrogen or argon. The initiator may be added at the outset of the reaction or, alternatively, may be added continuously or in aliquots during the course of the polymerization reaction, until the majority of the monomer components are consumed. Utilization of the monomer components, including their rate of consumption, during the polymerization may be monitored by carbon 13 NMR or liquid chromatography.

The two monomers defined by formula (I) and formula (II) are employed in relative amounts such that the polymerization reaction product contains the desired molar ratio of formula (I) monomer component and formula (II) monomer component, within the preferred ranges as described earlier. In an exemplary polymerization, the reaction mixture may be prepared by dissolving about 0.25 to about 25 parts by weight of formula (I) monomer component and about 25 to about 0.25 parts by weight of formula (II) monomer component (the total of the two monomer components being about 5 to about 75 parts by weight, and more preferably, about 40 to about 70 parts per weight) and about 0.1 to about 5 parts by weight of initiator, in about 35 to about 95 parts by weight of a solvent, such as water.

The average weight molecular weight (Mw) of the polymer reaction product may be determined by conventional methods, such as aqueous size exclusion chromatography, using, e.g., a polyethylene oxide/polyethylene glycol standard calibration. In the Examples described below, size exclusion chromatography was performed using a 0.4M lithium acetate and 2.0% ethylene glycol (pH 4.5) mobile phase at 0.25 mL/minute flow rate, with a Synchrom DAT-SEC column set (4000+1000+300+100 columns in series).

The polymerization reaction product of this invention is a water-soluble polymer and consequently may be utilized as an aqueous solution or dispersion thereof. As described in more detail below, such aqueous solutions of the polymerization reaction product may be employed as a paper sizing enhancer in the manufacture of sized paper and may optionally contain the sizing agent in the aqueous medium.

The polymerization reaction products of this invention serve as highly effective paper sizing enhancers in combination with conventional papermaking sizing agents. For papermaking carried out under alkaline pH manufacturing conditions, sizing agents based on alkyl or alkenyl ketene dimers or multimers and alkenyl succinic anhydride sizing agents are preferred. For traditional acid pH papermaking conditions, rosin-derived sizing agents are typically used. Combinations of these and other paper sizing agents may also be employed.

These and other hydrophobic sizing agents are well known in the art, and a wide variety of such sizing agents may be employed in combination with the paper sizing enhancer of this invention. Paper sizing agents are usually employed as aqueous emulsions, aqueous dispersions or aqueous solutions. The term "emulsion" is used herein, as is customary in the art, to mean either a dispersion of the liquid-in-liquid type or of the solid-in-liquid type.

Ketene dimers used as paper sizing agents are well known. Alkyl ketene dimers, containing one β-lactone ring, are typically prepared by the dimerization of alkyl ketenes made from two fatty acid chlorides. Commercial alkyl ketene dimer sizing agents are often prepared from palmitic and/or stearic fatty acids, e.g., Hercon® sizing agents (Hercules Incorporated, Wilmington, Del.).

Alkenyl ketene dimer sizing agents are also commercially available, e.g., Aquapel® sizing agents (Hercules Incorporated, Wilmington, Del.) and Precis® sizing agents (Hercules Incorporated, Wilmington, Del.). Ketene multimers, containing more than one β-lactone ring, may also be employed as paper sizing agents, and these may be alkyl or alkenyl ketene dimers.

Ketene dimers used as paper sizing agents are generally dimers having the formula

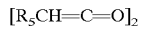

where $R_5$ is a hydrocarbon radical, such as alkyl having at least 8 carbon atoms, cycloalkyl having at least 6 carbon atoms, aryl, aralkyl and alkaryl. In naming ketene dimers, the radical "$R_5$" is named followed by "ketene dimer". Thus, decyl ketene dimer is $[C_{10}H_{21}-CH=C=O]_2$. Examples of ketene dimers include octyl, decyl, dodecyl, tetradecyl, hexadecyl, octadecyl, eicosyl, decosyl, tetracosyl, phenyl, benzyl, beta-naphthyl and cyclohexyl ketene dimers, as well as the ketene dimers prepared from montamic acid, naphthenic acid, Δ9,10-decylenic acid, Δ9,10-dodecylenic acid, palmitoleic acid, oleic acid, ricinoleic acid, linoleic acid, linolenic acid, and eleostearic acid, as well as ketene dimers prepared from naturally occurring mixtures of fatty acids, such as those mixtures in coconut oil, babassu oil, palm kernel oil, palm oil, olive oil, peanut oil, rapeseed oil, beef tallow, lard (leaf) and whale blubber. Mixtures of any of the above-named fatty acids with each other may also be used.

Hydrophobic acid anhydrides useful as sizing agents for paper include:
(i) rosin anhydride (see U.S. Pat. No. 3,582,464, for example, the disclosure of which is incorporated herein by reference);
(ii) anhydrides having the structure

where $R_6$ is a saturated or unsaturated hydrocarbon radical, the hydrocarbon radical being a straight or branched chain alkyl radical, an aromatic substituted alkyl radical, or an alkyl substituted aromatic radical so long as the hydrocarbon radical contains a total of from about 14 to about 36 carbon atoms; and (iii) cyclic dicarboxylic acid anhydrides, preferably having the structure

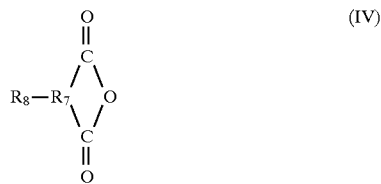

where $R_7$ represents a dimethylene or trimethylene radical and where $R_8$ is a hydrocarbon radical containing more than 7 carbon atoms which are selected from the group consisting of alkyl, alkenyl, aralkyl or aralkenyl. Preferred substituted cyclic dicarboxylic acid anhydrides falling within the above formula (IV) are substituted succinic and glutaric anhydrides. In formula (III) above each $R_6$ can be the same hydrocarbon radical or each $R_6$ can be a different hydrocarbon radical.

Specific examples of anhydrides of formula (III) are myristoyl anhydride; palmitoyl anhydride; oleoyl anhydride; and stearoyl anhydride.

Specific examples of anhydrides of formula (IV) are i- and n-octadecenyl succinic acid anhydride; i- and n-hexadecenyl succinic acid anhydride; i- and n-tetradecenyl succinic acid anhydride; dodecyl succinic acid anhydride; decenyl succinic acid anhydride; ectenyl succinic acid anhydride; and heptyl glutaric acid anhydride.

Hydrophobic organic isocyanates, e.g., alkylated isocyanates, are another class of compounds used as paper sizing agents that are well known in the art. Best results are obtained when the hydrocarbon chains of the isocyanates are alkyls that contain at least 12 carbon atoms, preferably from 14 to 18 carbon atoms. Such isocyanates include rosin isocyanate; dodecyl isocyanate; octadecyl isocyanate; tetradecyl isocyanante; hexadecyl isocyanate; eicosyl isocyanate; docosyl isocyanate; 6-ethyldecyl isocyanate; 6-phenyldecyl isocyanate; and polyisocyanates such as 1,18-octadecyl diisocyanate and 1,12-dodecyl diisocyanate, wherein one long chain alkyl group serves two isocyanate radicals and imparts hydrophobic properties to the molecule as a whole.

Other conventional paper sizing agents suitable for use in this invention include alkyl carbamoyl chlorides, alkylated melamines such as stearylated melamines, styrene acrylates and styrene maleic anhydrides.

The polymerization reaction product may be used as a paper sizing enhancer according to this invention via an internal addition method or via a surface application (external) method, or via a combination of these methods.

Satisfactory performance of the polymerization reaction product as a sizing enhancer is generally obtained regardless of the particular method of application employed.

In the internal addition method, the sizing enhancer is introduced as a chemical additive into the paper furnish during the papermaking process. The sizing enhancer is introduced in combination with the paper sizing agent (or agents), either as separately introduced solutions/dispersions or as an aqueous medium containing both components. Separate addition of the sizing enhancer and paper sizing agent (or agents) is preferred. Other conventional papermaking compounds or additions may also be employed with the sizing enhancer and/or sizing agent.

In the surface application method, the sizing enhancer is ordinarily applied as a coating, by conventional coating or spraying techniques, to the preformed paper, and the coating is dried. The paper is then coated with an appropriate paper sizing agent (or agents) and dried again. Alternatively, the paper sizing agent and sizing enhancer may be applied in a surface treatment method in a single application, with an aqueous coating medium containing paper sizing agent, sizing enhancer and, optionally, other conventional components.

Other optional components, for use in an internal addition method and/or surface application method, may include a variety of additives conventionally used in papermaking, such as starch, fillers, pulp, retention aids, strengthening additives, drainage aids, colorants, optical brighteners, defoamers and the like.

Regardless of the method employed, the polymerization reaction product sizing enhancer ("polymer") and the paper sizing agent ("size") should be utilized in a respective weight ratio of from about 0.05:1 to about 4:1 polymer:size; preferably, from about 0.2:1 to about 3:1 polymer:size. The higher polymer:size ratios within these ranges are preferred since they generally provide better enhancement of the sizing property characteristics.

The paper sizing agent (or agents) is ordinarily used in an amount to provide good sizing property characteristics in the paper. Sized paper typically contains from about 0.005 to about 1.5 wt %, preferably, from about 0.025 to about 0.5 wt % and, more preferably, from about 0.05 to about 0.25 wt % paper sizing agent, based on the weight of the dried sized paper.

When the polymerization reaction product of this invention is employed as a sizing enhancer in combination with a conventional paper sizing agent, the amount of paper sizing agent in the sized paper may be decreased without sacrifice of the paper sizing property. The sizing enhancer of this invention can also be used in combination with other, conventional sizing enhancers or sizing additives.

Sufficient sizing enhancer should be employed to yield sized paper containing the sizing enhancer in an amount of from about 0.002 to about 0.6 wt %, preferably, from 0.007 to about 0.3 wt %, and, more preferably, from about 0.012 to about 0.15 wt %, based on the weight of the dried sized paper.

One advantage of the sizing enhancer of this invention is that the sized paper need only be dried to a residual moisture level of from about 8 wt % to about 12 wt %, based on the weight of the paper, to provide satisfactory sizing property characteristics. Without the sizing enhancer, such sized paper typically needs to be dried to a residual moisture level of about 4–6 wt % to achieve equivalent sizing property characteristics. When dried to such conventionally used moisture levels, sized paper employing the sizing enhancer of this invention provides even better sizing property characteristics.

The polymerization reaction product of this invention provides numerous other advantages as paper sizing enhancers:

(1) The rate at which the sizing property develops in sized paper is significantly increased with the use of the sizing enhancers described in this specification.

(2) The efficiency of paper sizing agents is also increased with the use of these sizing enhancers, permitting lower levels of paper sizing agent to be employed without decrease or loss of the desired sizing property in the sized paper. By allowing lower amounts of sizing agent, the invention alleviates the problems associated with the use of excess sizing agents, including paper handling problems (jams, misregisters, missed folds, sliding, slipping) and deposits during the papermaking process which decreases the paper quality and slows the papermaking production rate.

(3) Sized paper made with paper sizing agents in combination with these sizing enhancers exhibits greatly reduced loss of sizing property over time and in many cases, no loss of sizing property in the aged sized paper.

(4) Sized paper produced especially for use in ink jet printing applications exhibits increased print quality when the sizing enhancers of this invention are utilized with the paper sizing agent.

Several general procedures applicable to the polymerization reaction products of this invention and their use are described below.

Hercules Size Test

The sizing property performance in sized paper may be characterized by the Hercules Size Test, a well-recognized test for measuring sizing performance. The Hercules Size Test is described in *Pulp and Paper Chemistry and Chemical Technology*, J. P. Casey, Ed., Vol. 3, p. 1553–1554 (1981) and in TAPPI Standard T530. The Hercules Size Test determines the degree of water sizing obtained in paper, by measuring the change in reflectance of the paper's surface as an aqueous solution of dye penetrates from the opposite surface side. The aqueous dye solution, e.g., naphthol green dye in 1% formic acid in the Examples described below, is contained in a ring on the top surface of the paper, and the change in reflectance is measured photoelectrically from the bottom surface.

Test duration is limited by choosing a convenient end point, e.g., a reduction in reflected light of 20%, corresponding to 80% reflectance, in the Examples described below. A timer measures the time (in seconds) for the end point of the test to be reached. Longer times correlate with increased sizing performance, i.e., resistance to water penetration increases. Unsized paper will typically fail at 0 seconds, lightly sized paper will register times of from about 1 to about 20 seconds, moderately sized paper from about 21 to about 150 seconds, and hard sized paper from about 151 to about 2000 seconds or more.

Polymerization Reaction Product General Procedure

A water-soluble polymer of diallyldimethylammonium chloride (DADMAC) and diallylammonium chloride (DAA.HCl) may be prepared by the following general procedure.

An aqueous mixture of the two monomer components is made by adding the respective monomer components in water in the appropriate mole ratio sought in the polymerization reaction product. The aqueous reaction mixture is degassed with an inert gas, such as nitrogen or argon, and warmed to a temperature of about 40° to about 100° C., with mixing.

A water-soluble free radical polymerization initiator, such as 2,2'-azobis (2-amidinopropane) hydrochloride, is added either in aliquots or continuously to the reaction mixture, until the majority of the monomer components have been consumed in the polymerization reaction. Water is usually added to the reaction mixture during the polymerization reaction to prevent the viscosity in the aqueous reaction mixture from becoming excessive. The concentration of the monomer components in the aqueous reaction mixture should not be dilute, since high concentrations of the monomers provide better polymerization results.

Examples 1–23, described below, are exemplary of this general procedure for obtaining the polymerization reaction products of this invention.

For all of the Examples described below, the sizing property of the paper was determined using the Hercules Size Test (as described above) immediately after the paper was made and also (in several of the Examples) after the paper was aged at 50% relative humidity and at a temperature of 22° C., for seven days or longer (as noted in the Examples)

All references in the Examples to "parts" refers to parts by weight.

The invention is illustrated further by the following specific, non-limiting Examples.

EXAMPLE 1

A water-soluble copolymer of diallyldimethylammonium chloride (DADMAC) and diallylammonium chloride (DAA.HCl) was prepared in this Example as follows. The monomer mole ratio used in the polymerization reaction product was about 8:2 DADMAC:DAA.HCl.

An aqueous mixture was made by combining 53.8 parts of 65 wt % diallyldimethylammonium chloride in water with 14.5 parts of 49.8 wt % diallylammonium chloride in water. The aqueous reaction mixture of the two monomer components was degassed with nitrogen for 40 minutes and warmed to a temperature of 55° C. with stirring.

A water-soluble free radical polymerization initiator, 4.23 parts of 9.09 wt % 2,2'-azobis (2-amidinopropane) hydrochloride in degassed water was added to the aqueous solution at a rate of 0.4 g/minute. After the addition of the initiator was complete, 16.9 parts of degassed water was added to reduce the viscosity of the reaction medium, and the mixture was maintained at a temperature of about 90° C.

The following step was carried out three times: 4.23 parts of 9.09 wt % 2,2'-azobis (2-amidinopropane) hydrochloride in degassed water was added rapidly, and the reaction mixture was then stirred for one hour.

At the end of the third one hour stirring period, analysis of the aqueous reaction mixture by carbon 13 NMR indicated that greater than 95% of the monomer components had been polymerized. The molecular weight data for the polymerization reaction product was determined by aqueous size exclusion chromatography (SEC) using a Synchrom DAT-SEC column set (4000+1000+300+100 columns in series), with 0.4M lithium acetate and 2.0% ethylene glycol (pH 4.5) as the mobile phase, at a flow rate of 0.25 mL/minute. These SEC measurements determined that the polymerization reaction product had a number average molecular weight (Mn) of about 21,700 and a weight average molecular weight (Mw) of about 364,000.

EXAMPLE 2

Another water-soluble copolymer of diallyldlmethylammonium chloride and diallylammonium chloride was prepared, as follows. The monomer mole ratio in the polymerization reaction product was about 8:2 DADMAC:DAA.HCl.

An aqueous mixture was made by combining 53.8 parts of 65 wt % diallyldimethylammonium chloride in water with 14.5 parts of 49.8 wt % diallylammonium chloride in water. The aqueous reaction mixture of the two monomer components was degassed with nitrogen for 40 minutes and warmed to a temperature of 55° C. with stirring.

The polymerization initiator in this Example was 2,2'-azobis [2-(2-imidazolin-2-yl)propane] dihydrochloride, and 1.95 wt % (based on the weight of the monomers) of the initiator in degassed water was added at a constant rate to the reaction mixture with stirring over a period of 29 hours.

Analysis of the resultant polymerization reaction product via SEC measurements (as described in Example 1) determined that the product had a Mn of about 63,000 and a Mw of about 482,000 with a polydispersity ($M_w/M_n$) of 7.6.

EXAMPLE 3

Yet another water-soluble copolymer of diallyldimethylammonium chloride and diallylammonium chloride was prepared, as follows. The monomer mole ratio in the polymerization reaction product was about 8:2 DADMAC:DAA.HCl.

An aqueous mixture was made by combining 69 parts of 60 wt % diallyldimethylammonium chloride in water with 17.2 parts of 49.6 wt % diallylammonium chloride in water. The aqueous reaction mixture of the two components was degassed with nitrogen for 30 minutes and warmed to a temperature of 50° C. with stirring.

A polymerization initiator of 1.04 parts of 10 wt % t-butylhydroperoxide in degassed water and 0.75 parts of 7 wt % sodium bisulfite in degassed water was added to the reaction mixture at a rate such that the temperature of the reaction mixture was maintained below 85° C. After the initiator addition was complete, the reaction mixture was maintained at about 55°–65° C. for 5 hours, with stirring.

At the end of this period, analysis of the aqueous reaction mixture by carbon 13 NMR indicated that 94% of the monomer components had been polymerized. Analysis of the resultant polymerization reaction product via SEC measurements (as described in Example 1) determined that the product had a $M_n$ of about 15,000 and a $M_w$ of about 68,000 with a polydispersity ($M_w/M_n$) of 4.42

EXAMPLE 4

A water-soluble copolymer of diallyldimethylammonium chloride and diallylammonium chloride, having a monomer mole ratio of 9:1 DADMAC:DAA.HCl, was prepared as follows:

111.9 parts of 65 wt % diallyldimethylammonium chloride in water and 13.4 parts of 50.0 wt % diallylammonium chloride in water and 27 parts of distilled water were warmed to 55° C. while stirring. After warming, the solution was degassed with nitrogen for about 30 minutes. 1.36 parts of 2.2'-azobis(2-amidinopropane) hydrochloride in 10 parts of distilled, degassed water were then added. After the initiator addition was complete, the mixture was stirred for 2 hours, cooled to 30° C. and sparged with air for 30 minutes. SEC measurements determined that the product had a weight average molecular weight ($M_w$) of about 431,000 with a polydispersity of 5.1. Carbon 13 NMR analysis indicated that greater than 79% (mole basis) of the monomers had polymerized.

EXAMPLE 5

A water-soluble copolymer of diallyldimethylammonium chloride and diallylammonium chloride, having a monomer mole ratio of 7:3 DADMAC:DAA.HCl, was prepared as follows:

This Example followed a procedure identical to that of Example 4, except 94.5 parts of 60 wt % diallyldimethylammonium chloride, 40.0 parts of 50.0 wt % diallylammonium chloride, 13 parts of distilled water were used. SEC measurements determined that the product had a weight average molecular weight ($M_w$) of about 322,000 with a polydispersity of 4.8. Carbon 13 NMR analysis indicated that greater than 81% (mole basis) of the monomers had polymerized.

EXAMPLE 6

A water-soluble copolymer of diallyldimethylammonium chloride and diallylammonium chloride, having a monomer mole ratio of 8:2 DADMAC:DAA.HCl, was prepared as follows:

646.8 parts of 60 wt % diallyldimethylammonium chloride in water and 161.4 parts of 49.6 wt % diallylammonium chloride in water were degassed with nitrogen for about 30 minutes. The degassed solution was warmed to 70° C. while stirring. After warming, 7.68 parts of 2,2'-azobis(2-amidinopropane) hydrochloride in 64 parts of distilled, degassed water were added at a constant rate over about 23.3 hours. 60.0, 60.0, 60.0 and 360.0 part aliquots of distilled, degassed water were added after about 5, 5.5, 6 and 8 hours, respectively, after beginning the addition of the initiator. About one hour after the initiator addition was complete, the mixture was blanketed with air. 180 parts of water were added and the solution was allowed to cool to ambient temperature. SEC measurements determined that the product had a weight average molecular weight ($M_w$) of about 398,000 with a polydispersity of 10.8. Carbon 13 NMR analysis indicated that greater than 92.5% (mole basis) of the monomers had polymerized.

EXAMPLE 7

A water-soluble copolymer of diallyldimethylammonium chloride and diallylammonium chloride, having a monomer mole ratio of 8.5:1.5 DADMAC:DAA.HCl, was prepared as follows:

229.0 parts of 60 wt % diallyldimethylammonium chloride in water and 40.4 parts of 49.6 wt % diallylammonium chloride in water were degassed with nitrogen for about 30 minutes. The degassed solution was warmed to 70° C. while stirring. After warming, 2.56 parts of 2,2'-azobis(2-amidinopropane) hydrochloride in 22 parts of distilled, degassed water were added at a constant rate over about 24 hours. 50.0, 60.0, 50.0, 50.0, and 100.0 part aliquots of distilled, degassed water were added after about 5.5, 7.0, 7.5, 9.0 and 11 hours, respectively, after beginning the addition of the initiator. About one hour after the initiator addition was complete, the mixture was blanketed with air and allowed to cool to ambient temperature. SEC measurements determined that the product had a weight average molecular weight ($M_w$) of about 470,000 with a polydispersity of 10.0 Carbon 13 NMR analysis indicated that 92% (mole basis) of the monomers had polymerized.

EXAMPLE 8

A water-soluble copolymer of diallyldimethylammonium chloride and diallylammonium chloride, having a monomer mole ratio of 9:1 DADMAC:DAA.HCl, was prepared as follows:

242.5 parts of 60 wt % diallyldimethylammonium chloride in water and 26.9 parts of 49.6 wt % diallylammonium chloride in water were degassed with nitrogen for about 30 minutes. The degassed solution was warmed to 70° C. while stirring. After warming, 2.56 parts of 2,2'-azobis(2-amidinopropane) hydrochloride in 22 parts of distilled, degassed water were added at a constant rate over about 25 hours 30.0, 30.0, 100.0, 60.0 and 50.0 part aliquots of distilled, degassed water were added after about 4, 5, 6, 7.3 and 9 hours, respectively, after beginning the addition of the initiator. About one hour after the initiator addition was complete, the mixture was blanketed with air and allowed to cool to ambient temperature. SEC measurements determined that the product had a weight average molecular weight ($M_w$) of about 473,000 with a polydispersity of 13.8. Carbon 13 NMR analysis indicated that greater than 93% (mole basis) of the monomers had polymerized.

EXAMPLE 9

A water-soluble copolymer of diallyldimethylammonium chloride and diallylammonium chloride, having a monomer mole ratio of 6:4 DADMAC:DAA.HCl, was prepared as follows:

161.7 parts of 60 wt % diallyldimethylammonium chloride in water and 107.3 parts of 49.8 wt % diallylammonium chloride in water were degassed with nitrogen for about 30 minutes. The degassed solution was warmed to 70° C. while stirring. After warming, 2.56 parts of 2,2'-azobis(2-amidinopropane) hydrochloride in 23 parts of distilled, degassed water were added at a constant rate over about 29 hours. 150.0 parts of distilled, degassed water were added after about 7 hours after beginning the addition of the initiator. About one hour after the initiator addition was complete, the mixture was blanketed with air. SEC measurements determined that the product had a weight average molecular weight ($M_w$) of about 414,000 with a polydispersity of 9.7. Carbon 13 NMR analysis indicated that 90% (mole basis) of the monomers had polymerized.

EXAMPLE 10

A water-soluble copolymer of diallyldimethylammonium ammonium chloride and diallylammonium chloride, having a monomer mole ratio of 8:2 DADMAC:DAA.HCl, was prepared as follows:

215.6 parts of 60 wt % diallyldimethylammonium chloride in water and 53.6 parts of 49.8 wt % diallylammonium chloride in water were degassed with nitrogen for about 30 minutes. The degassed solution was warmed to 70° C. while stirring. After warming, 2.56 parts of 2,2'-azobis(2-amidinopropane) hydrochloride in 23 parts of distilled, degassed water were added at a constant rate over about 27.23 hours. 62.5, 62.0, 62.0 and 80.0 part aliquots of distilled, degassed water were added after about 4.3, 5.5, 6.5 and 9 hours, respectively, after beginning the addition of the initiator. About one hour after the initiator addition was complete, the mixture was blanketed with air and allowed to cool to ambient temperature. SEC measurements determined that the product had a weight average molecular weight ($M_w$) of about 424,000 with a polydispersity of 11.4. Carbon 13 NMR analysis indicated that 91% (mole basis) of the monomers had polymerized.

Comparative Example 11

A homopolymer of diallyldimethylammonium chloride (100:0 mole ration of DADMAC:DAA.HCl) was prepared in this Comparative Example 11.

269.5 parts of 60 wt % diallyldimethylammonium chloride in water were degassed with nitrogen for about 30 minutes. The degassed solution was warmed to 70° C. while stirring. After warming, 2.56 parts of 2,2'-azobis(2-amidinopropane) hydrochloride in 23 parts of distilled, degassed water were added at a constant rate over about 25.7 hours. 123.0, 120.6 and 59.2 parts of distilled, degassed water were added after about 1.5, 1.7 and 4.3, hours, respectively, after beginning the addition of the initiator. About one hour after the initiator addition was complete, the mixture was blanketed with air and allowed to cool to ambient temperature. SEC measurements determined that the product had a weight average molecular weight ($M_w$) of about 385,000 with a polydispersity of 12.9. Carbon 13 NMR analysis indicated that 95% (mole basis) of the monomer had polymerized.

EXAMPLE 12

A water-soluble copolymer of diallyldimethylammonium ammonium chloride and diallylammonium chloride, having a monomer mole ratio of 7:3 DADMAC:DAA.HCl, was prepared as follows:

94.3 parts of 60 wt % diallyldimethylammonium chloride in water and 40.4 parts of 49.6 wt % diallylammonium chloride in water were degassed with nitrogen for about 30 minutes while the solution was brought up to 40° C. The degassed solution was warmed to 70° C. while stirring. After warming, 2.56 parts of 2,2'-azobis(2-amidinopropane) hydrochloride in 20 parts of distilled, degassed water were added at a constant rate over about 21.7 hours. 50.0 and 30.0 part aliquots of distilled, degassed water were added after about 3.7 and 4.5 hours, respectively, after beginning the addition of the initiator. About 1 hour after the initiator addition was complete, the mixture was blanketed with air and 23.6 parts of water were added and allowed to cool to ambient temperature. SEC measurements determined that the product had a weight average molecular weight ($M_w$) of about 387,000 with a polydispersity of 12.2. Carbon 13 NMR analysis indicated that 98% (mole basis) of the monomers had polymerized.

EXAMPLE 13

A water-soluble copolymer of diallyldimethylammonium ammonium chloride and diallylammonium chloride, having a monomer mole ratio of 3:7 DADMAC:DAA.HCl, was prepared as follows:

40.5 parts of 60 wt % diallyldimethylammonium chloride in water and 94.2 parts of 49.6 wt % diallylammonium chloride in water were degassed with nitrogen for about 30 minutes while the solution was brought up to 40° C. The degassed solution was warmed to 70° C. while stirring. After warming, 2.56 parts of 2,2'-azobis(2-amidinopropane) hydrochloride in 20 parts of distilled, degassed water was added at a constant rate over about 27.5 hours. 30.0, 50.0 and 20.0 part aliquots of distilled, degassed water were added after about 7, 8 and 11 hours, respectively, after beginning the addition of the initiator. About 0.5 hour after the initiator addition was complete, the mixture was blanketed with air and allowed to cool to ambient temperature. SEC measurements determined that the product had a weight average molecular weight ($M_w$) of about 347,000 with a polydispersity of 12.5. Carbon 13 NMR analysis indicated that 96% (mole basis) of the monomers had polymerized.

Comparative Example 14

A homopolymer of diallylammonium chloride (0:100 mole ratio of DADMAC:DAA.HCl) was prepared in this Comparative Example 14.

268.1 parts of 49.8 wt % diallylammonium chloride in water were degassed with nitrogen for about 30 minutes. The degassed solution was warmed to 70° C. while stirring. After warming, 3.84 parts of 2,2'-azobis(2-amidinopropane) hydrochloride in 33 parts of distilled, degassed water were added at a constant rate over about 24 hours. 50.0 and 50.0 parts of distilled, degassed water were added after about 21.5 and 24 hours, respectively, after beginning the addition of the initiator. About 16 hours after the initiator addition was complete, the mixture was blanketed with air and allowed to cool to ambient temperature. SEC measurements determined that the product had a weight average molecular weight ($M_w$) of about 385,000 with a polydispersity of 13. Carbon 13 NMR analysis indicated that 86% (mole basis) of the monomer had polymerized.

EXAMPLE 15

A water-soluble copolymer of diallyldimethylammonium ammonium chloride and diallylammonium chloride, having a monomer mole ratio of 5:5 DADMAC:DAA.HCl, was prepared as follows:

134.7 parts of 60 wt % diallyldimethylammonium chloride in water and 134.3 parts of 49.7 wt % diallylammonium chloride in water were degassed with nitrogen for about 30 minutes while the solution was brought up to 40° C. The degassed solution was warmed to 70° C. while stirring. After warming, 2.56 parts of 2,2'-azobis(2-amidinopropane) hydrochloride in 22 parts of distilled, degassed water was added at a constant rate over about 25 hours. 19.4, 30.0, 29.7, 46.9, 30.4, 19.3 and 31.3 part aliquots of distilled, degassed water were added after about 11, 11.5, 12, 12.5, 13.5, 14 and 15.5 hours, respectively, after beginning the addition of the initiator. The solution was allowed to cool to ambient temperature and 400 parts of water were added. SEC measurements determined that the product had a weight average molecular weight ($M_w$) of about 399,000 with a polydispersity of 8.1 Carbon 13 NMR analysis indicated that 79% (mole basis) of the monomers had polymerized.

EXAMPLE 16

A water-soluble copolymer of diallyldimethylammonium ammonium chloride and diallylammonium chloride, having a monomer mole ratio of 5:5 DADMAC:DAA.HCl, was prepared as follows:

67.3 parts of 60 wt % diallyldimethylammonium chloride in water and 66.8 parts of 50.0 wt % diallylammonium chloride in water and 7 parts of distilled water were warmed to 55° C. while stirring. After warming, the solution was degassed with nitrogen for about 30 minutes. 0.68 parts of 2,2'-azobis (2-amidinopropane) hydrochloride in 5 part of distilled, degassed water were then added over 1 minute. 35 and 66 part aliquots of distilled, degassed water were added after about 1 and 2 hours. The mixture was stirred for an additional 3 hours, cooled to about 30° C., and sparged with air for 30 minutes. SEC measurements determined that the product had a weight average molecular weight ($M_w$) of about 277,000 with a polydispersity of 3.6. Carbon 13 NMR analysis indicated that 50% (mole basis) of the monomers had polymerized.

EXAMPLE 17

A water-soluble copolymer of diallyldimethylammonium ammonium chloride and diallylammonium chloride, having a monomer mole ratio of 3:7 DADMAC:DAA.HCl, was prepared as follows:

40.5 parts of 60 wt % diallyldimethylammonium chloride in water and 93.5 parts of 50.0 wt % diallylammonium chloride in water and 2 parts of distilled water were warmed to 55° C. while stirring. After warming, the solution was degassed with nitrogen for about 30 minutes. 0.68 parts of 2,2'-azobis (2-amidinopropane) hydrochloride in 5 parts of distilled, degassed water were then added over 1 minute. 38 parts of distilled, degassed water were added after about 0.75 hour. The mixture was stirred for an additional 3 hours, cooled to about 30° C., and sparged with air for 30 minutes. SEC measurements determined that the product had a weight average molecular weight ($M_w$) of about 392,000 with a polydispersity of 5.8. Carbon 13 NMR analysis indicated that 50% (mole basis) of the monomers had polymerized.

EXAMPLE 18

A water-soluble copolymer of diallyldimethylammonium ammonium chloride and diallylammonium chloride, having a monomer mole ratio of 1:9 DADMAC:DAA.HCl, was prepared as follows:

13.5 parts of 60 wt % diallyldimethylammonium chloride in water and 120.2 parts of 50.0 wt % diallylammonium chloride in water and 3 parts of distilled water were warmed to 55° C. while stirring. After warming, the solution was degassed with nitrogen for about 30 minutes. 0.68 parts of 2,2'-azobis (2-amidinopropane) hydrochloride in 5 parts of distilled, degassed water were then added over 1 minute. The mixture was stirred for an additional 4.5 hours, cooled to about 30° C., and sparged with air for 30 minutes. SEC measurements determined that the product had a weight average molecular weight ($M_w$) of about 332,000 with a polydispersity of 5.4. Carbon 13 NMR analysis indicated that 40% (mole basis) of the monomers had polymerized.

Examples 19–22 illustrate the preparation of polymerization reaction products having a wide range of weight average molecular weights, but with the monomer mole ratio being constant.

EXAMPLE 19

A water-soluble copolymer of diallyldimethylammonium ammonium chloride and diallylammonium chloride, having a monomer mole ratio of 3:7 DADMAC:DAA.HCl, was prepared as follows:

20 parts of distilled, degassed water was heated to 70° C. 40.5 parts of 60 wt % diallyldimethylammonium chloride in water, 94.2 parts of 49.6 wt % diallylammonium chloride in water and 2.56 parts of 2,2'-azobis (2-amidinopropane) hydrochloride in 20 parts of water were degassed with nitrogen for about 30 minutes. The mixture was added to the 70° C. water over a period of about 60 hours. About 4 hours after the initiator addition was complete, the solution was allowed to cool to ambient temperature. SEC measurements determined that the product had a weight average molecular weight ($M_w$) of about 58,000 with a polydispersity of 2.8. Carbon 13 NMR analysis indicated that 75% (mole basis) of the monomers had polymerized.

EXAMPLE 20

Another water-soluble copolymer of diallyldimethylammonium chloride and diallylammonium chloride, having a monomer mole ratio of 3:7 DADMAC:DAA.HCl, was prepared as follows:

40.5 parts of 60 wt % diallyldimethylammonium chloride in water and 94.2 parts of 49.6 wt % diallylammonium chloride in water were degassed with nitrogen for about 30 minutes while the solution was brought up to 40° C. The degassed solution was warmed to 70° C. while stirring. After warming, 2.56 parts of 2,2'-azobis (2-amidinopropane) hydrochloride in 20 parts of distilled, degassed water was added over 27 minutes. After about 46 hours after the initiator addition was complete, the solution was allowed to cool to ambient temperature. SEC measurements determined that the product had a weight average molecular weight $M_w$) of about 88,000 with a polydispersity of 3.7. Carbon 13 NMR analysis indicated that 82% (mole basis) of the monomers had polymerized.

EXAMPLE 21

Another water-soluble copolymer of diallyldimethylammonium chloride and diallylammonium chloride, having a monomer mole ratio of 3:7 DADMAC:DAA.HCl, was prepared as follows:

40.5 parts of 60 wt % diallyldimethylammonium chloride in water and 94.0 parts of 49.7 wt % diallylammonium chloride in water were degassed with nitrogen for about 30 minutes while the solution was brought up to 40° C. The degassed solution was warmed to 70° C. while stirring. After warming, 0.64 parts of 2,2'-azobis (2-amidinopropane) hydrochloride in 5 parts of distilled, degassed water was added at a constant rate over about 28.5 hours. About one hour after the initiator addition was complete, the solution was allowed to cool to ambient temperature. SEC measurements determined that the product had a weight average molecular weight $M_w$) of about 133,000 with a polydispersity of 3.3. Carbon 13 NMR analysis indicated that 38% (mole basis) of the monomers had polymerized.

EXAMPLE 22

Another water-soluble copolymer of diallyldimethylammonium chloride and diallylammonium chloride, having a monomer mole ratio of 3:7 DADMAC:DAA.HCl, was prepared as follows 40.5 parts of 60 wt % diallyldimethylammonium chloride in water and 94.0 parts of 49.7 wt % diallylammonium chloride in water and 5 parts of distilled water were degassed with nitrogen for about 30 minutes while the solution was brought up to 55° C. 0.32 parts of 2,2'-azobis (2-amidinopropane) hydrochloride in 2.5 parts of distilled, degassed water was added over about 3 minutes. After about 3 hours, 0.16 parts of additional 2,2'-azobis(2-amidinopropane hydrochloride in 1.75 parts of distilled, degassed water was added over 2 minutes. After 5 hours, the solution was sparged with air and allowed to cool to ambient temperature. SEC measurements determined that the product had a weight average molecular weight ($M_w$) of about 283,000 with a polydispersity of 4.3. Carbon 13 NMR analysis indicated that 16% (mole basis) of the monomers polymerized.

EXAMPLE 23

A water-soluble copolymer of diallyldimethylammonium ammonium chloride and diallylammonium chloride, having a mole ratio of 8:2 DADMAC:DAA.HCl, was prepared using a combination of initiators in the polymerization reaction, as follows:

199.38 parts of 65 wt % diallyldimethylammonium chloride in water and 39.12 parts of 68 wt % diallylammonium chloride in water are degassed with nitrogen for 60 minutes and warmed to 70° C. while stirring. 1.25 parts of 2,2'-azobis (2-amidinopropane) hydrochloride in 12.5 parts of distilled, degassed water is added at a constant rate over 3 hours. After addition of this initiator was complete, 37.5 parts of 10% ammonium persulfate solution was thoroughly mixed into the reaction solution. Stirring was stopped and the mixture was heated to 95° C. and held for 3 hours. The mixture was then diluted with water to 20% solids and allowed to cool to about 25° C. SEC measurements determined that the product had a weight average molecular weight $M_w$) of 448,000 and a polydispersity of 11.2 Carbon 13 NMR analysis indicated that 87% (mole basis) of the monomers had polymerized.

The Examples which follow demonstrate the performance characteristics of the polymerization reaction products of this invention in enhancing paper sizing properties.

Paper Making General Procedures

Preparation of the paper in Examples 24–38, described below, utilized the following general procedures.

Examples 24–31 and 35–38, described below, are based on internal addition of the paper sizing agent and sizing enhancers (as opposed to a surface application method). In those Examples, a pilot scale Fourdrinier papermaking machine was operated to make 65 g/m² basis weight paper.

Chemical additives, including paper sizing agents and sizing enhancers, were added to the paper furnish (pulp and filler) during operation of the papermaking machine. The type of furnish, chemical additives employed and points at which the additives were introduced are noted. Addition levels of chemical additives are expressed as a percentage of the dry weight of the paper furnish.

Examples 32–34, described below, utilized a surface application method in which standard 65 g/m² basis weight kraft paper was surface treated (as described in the Examples) with chemical additives, including sizing agents and sizing enhancers. The paper used in Examples 32–34, described below, was prepared using a pilot Fourdrinier papermaking machine using a 70:30 bleached hardwood:bleached softwood pulp beaten to 425 mL Canadian standard freeness (TAPPI Standard T227). The paper contained 12 wt % precipitated calcium carbonate filler.

EXAMPLE 24

The performance of the polymerization reaction product prepared in Example 1 was evaluated in sized paper at several different use levels, with two different commercial sizing agents. Commercially available sizing enhancers were also included in the evaluation to provide a performance benchmark for the polymerization reaction product sizing enhancer of this invention. A control, with no sizing enhancer present, was also included in the evaluation.

The commercial sizing agents utilized were Precis® 2000 paper sizing agent (Hercules Incorporated, Wilmington, Del.), an aqueous starch-stabilized reactive alkaline sizing dispersion, and Hercon® 70 paper sizing agent (Hercules Incorporated, Wilmington, Del.), an aqueous alkyl ketene dimer sizing dispersion. The Precis® 2000 sizing agent was evaluated at a concentration of 0.09 wt %, and the Hercon® 70 sizing agent was evaluated at two different concentrations, 0.06 wt % and 0.07 wt %. All sizing agent concentrations noted in this Example and in subsequent Examples are based on the dry weight of the paper furnish.

Three commercial, state-of-the-art sizing enhancers were utilized for comparison purposes:

Reten® 203 resin (Hercules Incorporated, Wilmington, Del.)—a homopolymer of diallyldimethylammonium chloride;

Reten® 204 resin (Hercules Incorporated, Wilmington, Del.)—polyamine/epichlorohydrin polymer; and Reten® 201 (Hercules Incorporated, Wilmington, Del.) —a low molecular weight, high charge density polyamine/epichlorohydrin polymer.

Three different concentrations of sizing enhancer were evaluated for each sizing agent parameter set employed, as shown in Table 1 below. All sizing enhancer concentrations noted in Table 1 of this Example and in subsequent Examples are based on the dry weight of the paper furnish.

The pilot Fourdrinier papermaking machine was operated with a paper furnish of 70:30 bleached hardwood:bleached softwood beaten to 417 mL Canadian standard freeness. Paper furnish was warmed to about 44° C. with steam at the constant level chest for all internal additions unless otherwise indicated. Additives employed included 20 wt % precipitated calcium carbonate filler added at the machine chest, 0.1 wt % alum added at the fan pump inlet, 0.02 wt % retention aid (high weight average molecular weight ($10^7$) acrylate:acrylamide (3:7) polymer) added at the fan pump outlet, 0.4 wt % cationic starch added at the first mix box, paper sizing agent added at the second mix box and sizing enhancer also added at the second mix box. System pH was maintained at 8.2.

Table 1 below summarizes the results, measured as Hercules Size Test (HST) measurements (with aqueous 1% formic acid and naphthol green dye, for an 80% reflectance endpoint), for all of the evaluations carried out in this Example. The results demonstrate the clear and consistently superior sizing property obtained with the polymerization reaction product of this invention, at all concentration levels of sizing agents and enhancers employed.

TABLE 1

| Sizing Agent and Amount Added (wt %) | Sizing Enhancer | Amount of Sizing Enhancer Added (wt %) | HST Sizing Property (sec) |
|---|---|---|---|
| Precis ® 2000 0.09 | None | 0 | 7 |
| Precis ® 2000 0.09 | Reten ® 203 | 0.0225 | 26 |
| Precis ® 2000 0.09 | Reten ® 204 | 0.0225 | 38 |
| Precis ® 2000 0.09 | Example 1 Copolymer | 0.0225 | 42 |
| Precis ® 2000 0.09 | Reten ® 203 | 0.045 | 66 |
| Precis ® 2000 0.09 | Reten ® 204 | 0.045 | 59 |
| Precis ® 2000 0.09 | Example 1 Copolymer | 0.045 | 116 |
| Precis ® 2000 0.09 | Reten ® 203 | 0.09 | 140 |
| Precis ® 2000 0.09 | Reten ® 204 | 0.09 | 89 |
| Precis ® 2000 0.09 | Example 1 Copolymer | 0.09 | 209 |
| Hercon ® 70 0.06 | None | 0 | 1 |
| Hercon ® 70 0.06 | Reten ® 201 | 0.015 | 4 |
| Hercon ® 70 0.06 | Example 1 Copolymer | 0.015 | 6 |
| Hercon ® 70 0.06 | Reten ® 201 | 0.03 | 4 |
| Hercon ® 70 0.06 | Example 1 Copolymer | 0.03 | 53 |
| Hercon ® 70 0.06 | Reten ® 201 | 0.06 | 4 |
| Hercon ® 70 0.06 | Example 1 Copolymer | 0.06 | 206 |
| Hercon ® 70 0.07 | None | 0 | 3 |
| Hercon ® 70 0.07 | Reten ® 201 | 0.0175 | 15 |
| Hercon ® 70 0.07 | Example 1 Copolymer | 0.0175 | 61 |
| Hercon ® 70 0.07 | Reten ® 201 | 0.035 | 24 |
| Hercon ® 70 0.07 | Example 1 Copolymer | 0.035 | 133 |
| Hercon ® 70 0.07 | Reten ® 201 | 0.07 | 13 |
| Hercon ® 70 0.07 | Example 1 Copolymer | 0.07 | 284 |

EXAMPLE 25

In this Example, the performance of the polymerization reaction product prepared in Example 1 was evaluated further in sized paper at several different use levels, with a commercial sizing agent. The procedure of this Example 25 used papermaking conditions different from those described for Example 24. Commercially available sizing enhancers were again included in the evaluation to provide a performance benchmark for the polymerization reaction product sizing enhancer of this invention. A control, with no sizing enhancer present, was also included in the evaluation.

The commercial sizing agent utilized was Hercon® 70 paper sizing agent, and it was evaluated at two different concentrations, 0.1 wt % and 0.15 wt %.

The two commercial sizing enhancers utilized in this Example were Reten® 203 resin; and Reten® 204 resin.

Three different concentrations of sizing enhancer were evaluated, two at one sizing agent concentration and the third, at a higher sizing agent use level, all as shown in Table 2 below.

The pilot Fourdrinier papermaking machine was operated with a paper furnish of 50:25:15:10 coated broke:bleached hardwood kraft:bleached softwood kraft:chemithermomechanical pulp. Additives employed included 6 wt % precipitated calcium carbonate filler and 4 wt % titanium oxide filler added at the blend chest, 0.2 wt % Reten® 201 sizing enhancer (Hercules Incorporated, Wilmington, Del.) added at the fan pump inlet, 0.02 wt % retention aid (high weight average molecular weight ($2\times10^7$) acrylate:acrylamide (3:7) polymer) added at the fan pump outlet, 0.7 wt % cationic starch added at the first mix box, paper sizing agent added at the first mix box and sizing enhancer added at the second mix box. System pH was maintained at 8.2.

Table 2 below summarizes the results, measured as Hercules Size Test measurements taken immediately after the sized paper was made and also taken seven days later for the aged sized paper, for the evaluations carried out in this Example. The results demonstrate the increased sizing efficiency and increased rate of sizing property obtained with the polymerization reaction product of this invention, at all concentration levels of sizing agent and enhancers employed.

TABLE 2

| Sizing Agent and Amount Added (wt %) | Sizing Enhancer | Amount of Sizing Enhancer Added (wt %) | HST Sizing Property: directly after paper was made (sec) | HST Sizing Property: after paper aged 7 days (sec) |
|---|---|---|---|---|
| Hercon ® 70 0.1 | None | 0 | 4 | 59 |
| Hercon ® 70 0.1 | Reten ® 204 | 0.033 | 3 | 78 |
| Hercon ® 70 0.1 | Reten ® 203 | 0.033 | 9 | 81 |
| Hercon ® 70 0.1 | Example 1 Copolymer | 0.033 | 11 | 106 |
| Hercon ® 70 0.1 | Reten ® 204 | 0.067 | 6 | 105 |
| Hercon ® 70 0.1 | Reten ® 203 | 0.067 | 12 | 97 |
| Hercon ® 70 0.1 | Example 1 Copolymer | 0.067 | 49 | 115 |
| Hercon ® 70 0.15 | None | 0 | 21 | 181 |
| Hercon ® 70 0.15 | Reten ® 204 | 0.1 | 36 | 234 |
| Hercon ® 70 0.15 | Reten ® 203 | 0.1 | 58 | 215 |
| Hercon ® 70 0.15 | Example 1 Copolymer | 0.1 | 139 | 294 |

EXAMPLE 26

In this Example, the performance of the polymerization reaction product prepared in Example 1 was again evaluated as a sizing enhancer in sized paper, using Precis® 2000 paper sizing agent. For comparison, four different levels of sizing agent were used without any sizing enhancer present, as a control to gauge the performance effectiveness of the polymerization reaction product of this invention at a single use level.

The papermaking system described for Example 24 was again used, except that 50% of the paper furnish was recycled newsblank.

Table 3 below summarizes the results, measured as Hercules Size Test measurements taken immediately after the sized paper was made and also 28 days later for the aged sized paper. The results demonstrate that the polymerization reaction product enhancer of this invention accelerates the rate at which the sizing property develops and also increases the sizing efficiency.

TABLE 3

| Sizing Agent and Amount Added (wt %) | Sizing Enhancer | Amount of Sizing Enhancer Added (wt %) | HST Sizing Property: directly after paper was made (sec) | HST Sizing Property: after paper aged 4 weeks (sec) | Percentage of Sizing Property developed directly after paper was made |
|---|---|---|---|---|---|
| Precis ® 2000 0.20 | None | 0 | 5 | 8 | 63 |
| Precis ® 2000 0.25 | None | 0 | 7 | 28 | 25 |
| Precis ® 2000 0.30 | None | 0 | 7 | 73 | 10 |
| Precis ® 2000 0.40 | None | 0 | 6 | 333 | 2 |
| Precis ® 2000 0.20 | Example 1 Copolymer | 0.05 | 36 | 39 | 92 |
| Precis ® 2000 0.20 | Example 1 Copolymer | 0.1 | 157 | 148 | 100 |
| Precis ® 2000 0.20 | Example 1 Copolymer | 0.2 | 239 | 199 | 100 |

EXAMPLE 27

In this Example, two different versions of the polymerization reaction product were compared for their performance as sizing enhancers in sized paper.

For comparison, sized paper containing no enhancer (at two use levels of sizing agent) and sized paper containing two different commercial sizing enhancers were also included in the evaluation.

The paper was sized in each of these studies with Hercon® 70 sizing agent. The papermaking procedure was identical to that described in Example 24, except that 15 wt % clay filler was employed (in place of the precipitated calcium carbonate filler) and 0.5 wt % cationic starch was added (instead of 0.4 wt %). System pH was maintained at 7.1, since the precipitated calcium carbonate filler that was used previously was replaced with the clay filler.

The polymerization reaction products utilized in this Example were prepared from a 9:1 mole ratio of DADMAC:DAA.HCl in one case, and an 7:3 mole ratio of DADMAC:DAA.HCl in the second case, as described in Examples 4 and 5, respectively.

The two commercial sizing enhancers used for comparative purposes were Reten® 203 resin and Reten® 204 resin.

Table 4 below summarizes the results, measured as Hercules Size Test measurements taken immediately after the sized paper was made and also seven days later for the aged sized paper. The results demonstrate that use of the polymerization reaction products of this invention as sizing enhancers provided a higher percentage of ultimate sizing property in the sized paper immediately after its manufacture, as compared with the sizing property achieved after seven days. The data in Table 4 indicate that use of the sizing enhancers of this invention accelerates the rate at which the sizing property develops.

TABLE 4

| Sizing Agent and Amount Added (wt %) | Sizing Enhancer | Amount of Sizing Enhancer Added (wt %) | HST Sizing Property: directly after paper is made (sec) | HST Sizing Property: after paper aged 7 days (sec) | Percentage of Sizing Property developed directly after paper was made |
|---|---|---|---|---|---|
| Hercon ® 70 0.10 | None | 0 | 0 | 2 | 0 |
| Hercon ® 70 0.20 | None | 0 | 4 | 1063 | 0.4 |
| Hercon ® 70 0.10 | Reten ® 204 | 0.15 | 1 | 1047 | 1 |
| Hercon ® 70 0.10 | Reten ® 203 | 0.15 | 34 | 389 | 9 |
| Hercon ® 70 0.10 | Example 4 Copolymer 9:1 DADMAC:DAA.HCl | 0.12 | 121 | 722 | 17 |
| Hercon ® 70 0.10 | Example 5 Copolymer 7:3 DADMAC:DAA.HCl | 0.12 | 273 | 1002 | 27 |

EXAMPLE 28

In this Example, the performance of the polymerization reaction product prepared in Example 1 was demonstrated further in a papermaking system different from those utilized in Examples 25–27 but similar to that utilized in Example 24.

The polymerization reaction product of Example 1 was utilized as a sizing enhancer at three different concentrations, as shown in Table 5 below, for two different use levels of Precis® 2000 paper sizing agent, the commercial sizing agent that was employed in this Example. Controls, in which no sizing enhancer was used, were also included at the two use levels of commercial sizing agent that were used.

The pilot Fourdrinier papermaking machine was operated with a paper furnish of 70:30 bleached hardwood:bleached softwood beaten to 417 mL Canadian standard freeness. Additives employed included 5 wt % precipitated calcium carbonate filler added at the third mix box, 0.1 wt % alum added at the fan pump inlet, 0.02 wt % retention aid (high weight average molecular weight ($10^7$) acrylate:acrylamide (3:7) polymer) added at the fan pump outlet, Precis® 2000 paper sizing agent added at the second mix box and sizing enhancer also added at the second mix box.

Table 5 below summarizes the results, measured as Hercules Size Test measurements taken immediately after the sized paper was made and also 28 days later for the aged sized paper. The results demonstrate that use of the polymerization reaction product of this invention as a sizing enhancer provides good sizing property efficiency at relatively low sizing agent concentrations and also accelerates the rate at which the sizing property develops.

TABLE 5

| Sizing Agent and Amount Added (wt %) | Sizing Enhancer | Amount of Sizing Enhancer Added | HST Sizing Property: directly after paper was made (sec) | HST Sizing Property: after paper aged 28 days (sec) |
|---|---|---|---|---|
| Precis® 2000 0.09 | None | 0 | 2 | 59 |
| Precis® 2000 0.09 | Example 1 Copolymer | 0.0225 | 55 | 147 |
| Precis® 2000 0.09 | Example 1 Copolymer | 0.045 | 163 | 214 |
| Precis® 2000 0.09 | Example 1 Copolymer | 0.09 | 306 | 309 |
| Precis® 2000 0.06 | None | 0 | 0 | 1 |
| Precis® 2000 0.06 | Example 1 Copolymer | 0.0225 | 2 | 14 |
| Precis® 2000 0.06 | Example 1 Copolymer | 0.045 | 49 | 72 |
| Precis® 2000 0.06 | Example 1 Copolymer | 0.09 | 152 | 196 |

EXAMPLE 29

In this Example, the performance of the polymerization reaction product prepared in Example 1 was evaluated as a sizing enhancer with three different commercial sizing agents, the use levels of sizing enhancer and of each sizing agent being identical in each evaluation. A control, with no sizing enhancer being present, was also included in the evaluation of each of the three sizing agents.

The papermaking system was identical to that described for Example 28.

The three sizing agents employed, each at a use level of 0.06 wt %, were Precis® 2000 sizing agent, alkenyl succinic acid anhydride (ASA), and Hercon® 70 sizing agent. The polymerization reaction product of Example 10 was used as a sizing enhancer at a concentration of 0.06 wt %.

Table 6 below summarizes the results, measured as Hercules Size Test measurements taken immediately after the sized paper was made. The results demonstrate a substantial increase in the sizing property benefit was obtained by use of the sizing enhancer of this invention, for each of the three sizing agents evaluated.

TABLE 6

| Sizing Agent and Amount Added (wt %) | Sizing Enhancer | Amount of Sizing Enhancer Added (wt %) | HST Sizing Property (sec) |
|---|---|---|---|
| Precis® 2000 0.06 | None | 0 | 2 |
| Precis® 2000 0.06 | Example 10 Copolymer | 0.06 | 98 |
| 0.06 ASA | None | 0 | 6 |
| 0.06 ASA | Example 10 Copolymer | 0.06 | 17 |
| Hercon® 70 0.06 | None | 0 | 2 |
| Hercon® 70 0.06 | Example 10 Copolymer | 0.06 | 116 |

EXAMPLE 30

In this Example, three different versions of the polymerization reaction product were evaluated as sizing enhancers, the reaction products containing monomer mole ratios that ranged from 8:2 to 9:1 DADMAC:DAA.HCl. Note that in Example 27, the two monomeric mole ratios were 9:1 and 7:3 for the polymerization reaction products of that Example. These three products were evaluated as sizing enhancers at three different concentrations (for each of the three products) in paper sized with 0.075 wt % Precis® 2000 sizing agent. A control, with no sizing enhancer present, was also included in the evaluation.

The polymerization reaction products utilized in this Example were prepared respectively from 90:10, 85:15 and 80:20 mole ratios of DADMAC:DAA.HCl. The polymerization reaction products were prepared as described in Examples 8 (90:10 mole ratio), 7 (85:15 mole ratio) and 6 (80:20 mole ratio). These reaction products were used as sizing enhancers at three concentrations, 0.019 wt %, 0.038 wt % and 0.075 wt %.

The papermaking procedure was identical to that described for Example 24.

Table 7 below summarizes the results, measured as Hercules Size Test measurements taken immediately after the sized paper was made. The results demonstrate that the polymerization reaction products with monomeric molar ratios of 8:2 to 9:1 provide approximately equivalent sizing property enhancement within the range of ratios studied, for the conditions employed in this evaluation.

TABLE 7

| Sizing Agent and Amount Added (wt %) | Copolymer Sizing Enhancer DADMAC:DAA.HCl Mole Ratio | Amount of Sizing Enhancer Added (wt %) | HST Sizing Property (sec) |
|---|---|---|---|
| Precis ® 2000 0.075 | NA | 0 | 10 |
| Precis ® 2000 0.075 | 9:1 | 0.019 | 34 |
| Precis ® 2000 0.075 | 8.5:1.5 | 0.019 | 30 |
| Precis ® 2000 0.075 | 8:2 | 0.019 | 38 |
| Precis ® 2000 0.075 | 9:1 | 0.038 | 65 |
| Precis ® 2000 0.075 | 8.5:1.5 | 0.038 | 74 |
| Precis ® 2000 0.075 | 8:2 | 0.038 | 82 |
| Precis ® 2000 0.075 | 9:1 | 0.075 | 179 |
| Precis ® 2000 0.075 | 8.5:1.5 | 0.075 | 122 |
| Precis ® 2000 0.075 | 8:2 | 0.075 | 205 |

EXAMPLE 31

This Example utilized polymerization reaction products made with two different monomeric mole ratios, 6:4 and 8:2 DADMAC:DAA.HCl.

The polymerization reaction products were prepared as described in Examples 9 (6:4 mole ratio) and 1 (8:2 mole ratio). These reaction products were used as sizing enhancers at two concentrations, 0.055 wt % and 0.085 wt %.

The sizing agent in this Example, as in Example 10 30, was Precis® 2000, and two different use levels were employed, 0.11 wt % and 0.2 wt %. Controls with sizing agent at higher use levels 0.16 wt % and 0.3 wt %, but without sizing enhancers being present, were also included in the evaluation.

The papermaking procedures and paper furnish differed from that of Example 30 and were as follows.

The pilot Fourdrinier papermaking machine was operated with a paper furnish of 45:55 recycled plate stock:recycled post-consumer fine paper. Additives employed included 20 wt % precipitated calcium carbonate filler added at the third mix box, 0.01 wt % (high weight average molecular weight ($10^7$) acrylate:acrylamide (3:7) polymer) retention aid added at the fan pump outlet, 0.7 wt % cationic starch added at the first mix box, Precis® 2000 paper sizing agent also added at the first mix box and sizing enhancer added at the second mix box.

Table 8 below summarizes the results, measured as Hercules Size Test measurements taken immediately after the sized paper was made, as well as seven days later for the aged sized paper. The results demonstrate that the 8:2 monomer molar ratio in the polymerization reaction product provides somewhat faster acceleration of the sizing property, as evidenced by the sizing property levels for the two ratios (8:2 and 6:4) at the time the sized paper was made. Overall sizing property achieved by use of the sizing enhancers of this invention in the aged paper appeared equivalent for the two monomer molar ratios studied.

TABLE 8

| Sizing Agent and Amount Added (wt %) | Copolymer Sizing Enhancer DADMAC:DAA.HCl Mole Ratio | Amount of Sizing Enhancer Added (wt %) | HST Sizing Property: directly after paper was made (sec) | HST Sizing Property: after paper aged 7 days (sec) |
|---|---|---|---|---|
| Precis ® 2000 0.165 | NA | 0 | 1 | 6 |
| Precis ® 2000 0.11 | 6:4 | 0.055 | 13 | 15 |
| Precis ® 2000 0.11 | 8:2 | 0.055 | 20 | 20 |
| Precis ® 2000 0.3 | NA | 0 | 4 | 25 |
| Precis ® 2000 0.2 | 6:4 | 0.085 | 145 | 123 |
| Precis ® 2000 0.2 | 8:2 | 0.085 | 171 | 130 |

EXAMPLE 32

This Example 32 and the two subsequent Examples differ from the previous Examples 24–31 in that the sizing agents and sizing enhancers were applied to the paper as a surface treatment, after the paper had been manufactured. A description of the preformed paper employed in these Examples is provided in the Paper Making General Procedures, located above.

In this Example 32, the polymerization reaction products of this invention are demonstrated to be effective as sizing enhancers when applied to the surface of preformed paper. The Example includes evaluations of polymerization reaction products containing monomer mole ratios that ranged from 1:9 to 9:1 DADMAC:DAA.HCl.

The polymerization reaction products were prepared as described in previous Examples. The following monomer molar ratios of DADMAC:DAA.HCl were used, and the preparation Example is noted in parentheses in the second column of Table 9 below: 9:1, 8:2, 7:3, 6:4, 5:5, 3:7 and 1:9. These reaction products were used as sizing enhancers at two concentrations on the sized preformed paper, 0.04 wt % and 0.05 wt %, as noted in Table 9 below. Two controls, homopolymerization reaction products with molar ratios of 100:0 and 0:100 DADMAC:DAA.HCl (prepared as described in Comparative Examples 11 and 14, respectively), were also included for comparative purposes at 0.04 wt % sizing enhancer use level.

The surface treatment of the preformed paper was carried out as follows. Paper strips were passed through a laboratory single-nip two-roll puddle-type size press, containing a dilute aqueous solution, emulsion or dispersion of the chemical additive, i.e., sizing agent or sizing enhancer. The paper was immediately dried between the felt and stainless steel of a rotating drum-type drier, at a temperature of 82° C. for 20 seconds.

For paper surface-treated with sizing agent and sizing enhancer, the aqueous solution of sizing enhancer was applied first by this procedure and then the aqueous dispersion of sizing agent was applied to the dried enhancer-coated paper in a second application using the same procedure. The amount of chemical additive on the surface-treated paper was calculated based on the weight of aqueous medium picked up by the paper strip.

The commercial sizing agent employed in this Example was Hercon® 70 sizing agent and two different use levels were employed, 0.10 wt % and 0.118 wt %. Controls with the sizing agent, but without sizing enhancers being present, were also included in the evaluation.

Table 9 below summarizes the results, measured as Hercules Size Test measurements taken immediately after the surface-treated sized paper was dried and also seven days later for the aged sized paper. The results demonstrate that the polymerization reaction products are highly effective in enhancing the sizing property, when applied as a surface-treatment to preformed paper, at all monomer molar ratios studied. The data also show that the sizing property development is also accelerated when the sizing enhancers of this invention are employed as a surface treatment on preformed sized paper.

again Hercon® 70 sizing agent, and the use level was 0.10 wt % on the preformed paper. A control with sizing agent, but without any sizing enhancer, was also included in the evaluation.

Table 10 below summarizes the results, measured as Hercules Size Test measurements taken immediately after the surface-treated sized paper was dried and also seven days later for the aged sized paper. The results demonstrate that the polymerization reaction products are highly effective in enhancing the sizing property and in accelerating development of the sizing property, over the range of polymer molecular weights evaluated.

TABLE 9

| Sizing Agent and Amount Added | Copolymer Sizing Enhancer DADMAC:DAA.HCl Mole Ratio (Example) | Amount of Sizing Enhancer Added (wt %) | HST Sizing Property: directly after paper was dried (sec) | HST Sizing Property: after paper aged 7 days (sec) | Percentage of Sizing Property developed directly after paper was made |
|---|---|---|---|---|---|
| Hercon® 70 0.10 | NA | 0 | 2 | 112 | 2 |
| Hercon® 70 0.10 | 100:0 (11) | 0.04 | 46 | 52 | 88 |
| Hercon® 70 0.10 | 8:2 (10) | 0.04 | 136 | 190 | 72 |
| Hercon® 70 0.10 | 7:3 (12) | 0.04 | 145 | 167 | 87 |
| Hercon® 70 0.10 | 6:4 (9) | 0.04 | 173 | 193 | 90 |
| Hercon® 70 0.10 | 5:5 (15) | 0.04 | 146 | 179 | 82 |
| Hercon® 70 0.10 | 3:7 (13) | 0.04 | 96 | 151 | 64 |
| Hercon® 70 0.10 | 0:100 (14) | 0.04 | 45 | 51 | 88 |
| Hercon® 70 0.118 | NA | 0 | 10 | 124 | 6 |
| Hercon® 70 0.118 | 9:1 (4) | 0.05 | 169 | 185 | 91 |
| Hercon® 70 0.118 | 7:3 (5) | 0.05 | 227 | 227 | 100 |
| Hercon® 70 0.118 | 5:5 (16) | 0.05 | 96 | 224 | 43 |
| Hercon® 70 0.118 | 3:7 (17) | 0.05 | 66 | 219 | 30 |
| Hercon® 70 0.118 | 1:9 (18) | 0.05 | 32 | 182 | 18 |

EXAMPLE 33

This Example 33 was similar to Example 32 in that the sizing enhancer was again evaluated in a surface treatment procedure. In this Example, the polymerization reaction product of this invention is demonstrated to be an effective sizing enhancer over a broad range of polymer molecular weights in the reaction product.

The polymerization reaction products were prepared as described in Examples 17 and 19–22, using a monomer molar ratio of 3:7 DADMAC:DAA.HCl. The polymer molecular weights in the five reaction products studied ranged from 58,000 to 392,000, as determined by size exclusion chromatography. In Table 10 below, the preparation Examples are noted in parentheses in the second column. The reaction products were used as sizing enhancers at a concentration of 0.04 wt % on the sized preformed paper.

The surface application procedures were carried out as described in Example 32. The commercial sizing agent was

TABLE 10

| Sizing Agent and Amount Added (wt %) | Weight Average Molecular Weight (Mw) of Copolymer Sizing Enhancer (DADMAC: DAA.HCl 3:7 Mole Ratio) (Example) | Amount of Sizing Enhancer Added (wt %) | HST Sizing Property: directly after paper was dried (sec) | HST Sizing Property: after paper aged 7 days (sec) |
|---|---|---|---|---|
| Hercon® 70 0.10 | NA | 0 | 2 | 112 |
| Hercon® 70 0.10 | 58,000 (19) | 0.04 | 81 | 133 |
| Hercon® 70 0.10 | 88,000 (20) | 0.04 | 118 | 154 |
| Hercon® 70 0.10 | 133,000 (21) | 0.04 | 142 | 169 |
| Hercon® 70 0.10 | 283,000 (22) | 0.04 | 178 | 213 |

TABLE 10-continued

| Sizing Agent and Amount Added (wt %) | Weight Average Molecular Weight (Mw) of Copolymer Sizing Enhancer (DADMAC:DAA.HCl 3:7 Mole Ratio) (Example) | Amount of Sizing Enhancer Added (wt %) | HST Sizing Property: directly after paper was dried (sec) | HST Sizing Property: after paper aged 7 days (sec) |
|---|---|---|---|---|
| Hercon® 70 0.10 | 392,000 (17) | 0.04 | 154 | 191 |

EXAMPLE 34

In this Example, the polymerization reaction product of this invention was demonstrated to improve the print quality of sized paper that was surface-treated with the reaction product.

The surface application procedures were carried out as described for Example 32. For this Example, the paper also contained sufficient Hercon® 70 sizing agent added via an internal addition method during papermaking to provide the paper with 39 seconds of sizing property as measured by the Hercules Size Test.

The paper was surface-treated with an aqueous dispersion containing lightly oxidized corn starch, Precis® 2000 sizing agent and sizing enhancer, at a temperature of 60° C. The sizing enhancer was the polymerization reaction product of Example 9 (6:4 DADMAC:DAA.HCl mole ratio) and was applied to the preformed paper at a concentration of 0.1 wt %. The commercial sizing agent was applied at two different use levels, 0.0125 wt % and 0.025 wt %. The cornstarch was applied at a level of 5.4 wt %.

Evaluation of the surface-treated coated paper was carried out using an inkjet printer, with print quality being determined by visual inspection of the resolution of the printed letters. Print samples were compared against 10 standards ranked from 1–10, with 1 being the highest quality.

Results are summarized in Table 11 below and demonstrate that higher inkjet print quality is obtained with the use of the polymerization reaction product of this invention as a surface-application treatment on sized preformed paper.

TABLE 11

| Sizing Agent and Amount Added (wt %) | Sizing Enhancer | Amount of Sizing Enhancer Added (wt %) | Ink Jet Print Quality |
|---|---|---|---|
| Precis® 2000 0.0125 | None | 0 | 7 |
| Precis® 2000 0.0125 | Example 9 Copolymer | 0.1 | 3 |
| Precis® 2000 0.025 | None | 0 | 5 |
| Precis® 2000 0.025 | Example 9 Copolymer | 0.1 | 2 |

EXAMPLE 35

In this Example, the performance of the polymerization reaction product prepared as described in Example 10 was demonstrated in a papermaking system with parameters different from those utilized in the previous Example.

The polymerization reaction product was employed as a sizing enhancer at two different concentrations for two different use levels of Hercon® 70 paper sizing agent. The use levels of sizing enhancer and commercial sizing agent, shown in Table 12 below, were 0.07 wt % and 0.105 wt % sizing enhancer at 0.07 wt % Hercon® 70 sizing agent and 0.06 wt % and 0.09 wt % sizing enhancer at 0.06 wt % Hercon® 70 sizing agent. Controls, in which no sizing enhancer was used, were also included at the two use levels of commercial sizing agent that were used.

The papermaking procedure and paper furnish were as follows. The pilot Fourdrinier papermaking machine was operated with a paper furnish of 100% recycled newsblank at pH 6.9. Additives employed included 0.1 wt % alum added at the fan pump inlet, 0.02 wt % retention aid (high molecular weight ($10^7$) acrylate:acrylamide (3:7) polymer) added at the fan pump outlet, Precis® 2000 paper sizing agent added at the second mix box, and sizing enhancer also added at the second mix box. No cationic starch or fillers were used in this Example.

Table 12 below summarizes the results, measured as Hercules Size Test measurements taken immediately after the sized paper was made and also seven days later for the aged sized paper. The results demonstrate that use of the polymerization reaction product of this invention as a sizing enhancer provides increased efficacy of sizing agent benefit at relatively low sizing agent concentrations and also accelerates the rate at which the sizing property develops. The data from this and previous Examples demonstrate that polymerization reaction product of this invention is an effective sizing enhancer under a variety of papermaking conditions.

TABLE 12

| Sizing Agent and Amount Added (wt %) | Sizing Enhancer | Amount of Sizing Enhancer Added (wt %) | HST Sizing Property: directly after paper is made (sec) | HST Sizing Property: after paper aged 7 days (sec) |
|---|---|---|---|---|
| Hercon® 70 0.07 | None | 0 | 2 | 71 |
| Hercon® 70 0.07 | Example 10 Copolymer | 0.07 | 5 | 123 |
| Hercon® 70 0.07 | Example 10 Copolymer | 0.105 | 9 | 208 |
| Hercon® 70 0.06 | None | 0 | 3 | 13 |
| Hercon® 70 0.06 | Example 10 Copolymer | 0.06 | 8 | 35 |
| Hercon® 70 0.06 | Example 10 Copolymer | 0.09 | 22 | 65 |

EXAMPLE 36

In this Example, the polymerization reaction product of this invention was demonstrated to be effective as a sizing enhancer, both when added separately from the sizing agent and when preblended with the sizing agent.

The polymerization reaction product was prepared as described in Example 1 and was utilized as a sizing enhancer at three different concentrations, 0.023 wt %, 0.047 wt % and 0.095 wt %, for a single use level, 0.08 wt %, of Precis® 2000 sizing agent. A control, with no sizing enhancer present, was also included in the evaluation.

The papermaking system was essentially the same as that described for Example 24.

In the situation where the sizing enhancer was blended with sizing agent, the resulting aqueous dispersion remained stable to agglomeration after storage at a temperature of 30° C. for four weeks.

Table 13 below summarizes the results, measured as Hercules Size Test measurements taken immediately after the sized paper was made. The results show that there was no difference in sizing property obtained for the preblended sizing agent and sizing enhancer and for the separately introduced components. In both approaches, the sizing enhancer of this invention provided an improvement in sizing agent efficiency, resulting in increased sizing property.

TABLE 13

| Sizing Agent and Amount Added (wt %) | Sizing Enhancer | Amount of Sizing Enhancer Added (wt %) | Method of Addition: Sizing Agent and Sizing Enhancer | HST Sizing Property: directly after paper was made (sec) |
|---|---|---|---|---|
| Precis ® 2000 0.08 | None | 0 | NA | 2 |
| Precis ® 2000 0.08 | Example 1 Copolymer | 0.023 | Separate | 28 |
| Precis ® 2000 0.08 | Example 1 Copolymer | 0.023 | Preblended | 32 |
| Precis ® 2000 0.08 | Copolymer from Example 1 | 0.047 | Separate | 109 |
| Precis ® 2000 0.08 | Example 1 Copolymer | 0.047 | Preblended | 109 |
| Precis ® 2000 0.08 | Example 1 Copolymer | 0.095 | Separate | 195 |
| Precis ® 2000 0.08 | Example 1 Copolymer | 0.095 | Preblended | 197 | added at the fan pump inlet, 0.01 wt % retention aid (high weight average molecular weight ($10^7$) acrylate:acrylamide (3:7) polymer) added at the fan pump outlet, 0.4 wt % cationic starch and paper sizing agent added at the second mix box, and sizing enhancer added at the first mix box. System pH was maintained at 8.2.

The commercial sizing agent used was Precis® 2000 sizing agent and this was used at two use levels, 0.08 wt % and 0.10 wt %. The sizing enhancer was employed at two concentrations, ranging between 0.04 wt % to 0.1 wt %, for each of the sizing agent use levels, as shown in Table 14 below. Controls with sizing agent at three use levels, ranging from 0.10 wt % to 0.16 wt %, but without any sizing enhancer being present, were also included in the evaluation.

Table 14 below summarizes the results, measured as Hercules Size Test measurements taken immediately after the sized paper was made and also four weeks later for the aged sized paper. As shown by the data for the controls, sized paper lacking a sizing enhancer lost 59–71% of its initial sizing property after being aged for four weeks. The results obtained for the evaluation with sizing enhancer being present demonstrate several advantages associated with the use of the polymerization reaction product of this invention:

(i) the initial sizing property benefit is increased when the sizing enhancer is present (ii) the extent of loss, i.e., percentage reduction, of sizing property is significantly reduced; and (iii) the rate of loss of sizing property is retarded.

TABLE 14

| Sizing Agent and Amount Added (wt %) | Sizing Enhancer | Amount of Sizing Enhancer Added (wt %) | HST Sizing Property: directly after paper was made (sec) | HST Sizing Property: after paper aged 4 weeks (sec) | Percentage Reduction in Sizing Property (after 4 weeks) |
|---|---|---|---|---|---|
| Precis ® 2000 0.10 | None | 0 | 7 | 2 | 71 |
| Precis ® 2000 0.12 | None | 0 | 22 | 8 | 64 |
| Precis ® 2000 0.16 | None | 0 | 39 | 16 | 59 |
| Precis ® 2000 0.08 | Example 1 Copolymer | 0.04 | 85 | 67 | 21 |
| Precis ® 2000 0.08 | Example 1 Copolymer | 0.08 | 153 | 133 | 13 |
| Precis ® 2000 0.10 | Example 1 Copolymer | 0.05 | 153 | 119 | 22 |
| Precis ® 2000 0.10 | Example 1 Copolymer | 0.1 | 226 | 205 | 9 |

EXAMPLE 37

In this Example, the sizing enhancer of this invention was used as a sizing enhancer in a paper system that ordinarily exhibits sizing reversion, i.e., loss of sizing property over a period of time. The sizing enhancer employed was polymerization reaction product prepared as described in Example 1.

The paper employed in this Example was similar to that described for Example 24 but with some differences.

The pilot Fourdrinier papermaking machine was operated with a paper furnish of 70:30 bleached hardwood:bleached softwood beaten to 425 mL Canadian standard freeness. Additives employed included 20 wt % precipitated calcium carbonate filler added at the fourth mix box, 0.1 wt % alum

EXAMPLE 38

This Example demonstrates that the sizing enhancer of this invention may be employed with a rosin-based sizing agent, to enhance sizing performance.

The sizing agent used was PFP 50 sizing agent (Hercules Incorporated, Wilmington, Del.), a rosin paste sizing agent. For comparison, Reten® 203 sizing agent was also used.

The internal addition procedure, described in the Papermaking General Procedure above, was followed using the following additives and addition points. The pilot Fourdrinier papermaking machine was operated with a paper furnish of 70:30 bleached hardwood:bleached softwood beaten to 417 mL Canadian standard freeness. Additives employed included 10 wt % clay filler added at the machine chest. 0.4 wt % alum added at the second mix box, 0.5% cationic starch added at the third mix box, and 0.025 wt % retention aid (7:93 mole ratio copolymer of 2-acryloyloxyethyltrimethylammonium chloride and acrylamide) added at the fan pump outlet, paper sizing agent added at the third mix box and sizing enhancer added at the first mix box. The papermaking pH was 6.5. The papermaking furnish was warmed to 54° C. with steam at the constant level chest.

Table 15 below summarizes the results, measured as Hercules Size Test measurements taken immediately after the sized paper was made. The results demonstrate the superior sizing property obtained with the polymerization reaction product of this invention, when used with a rosin-based sizing agent.

TABLE 15

| Sizing Agent and Amount Added (wt %) | Sizing Enhancer | Amount of Sizing Enhancer Added (wt %) | HST Sizing Property (sec) |
| --- | --- | --- | --- |
| PFP 50 0.40 | None | 0 | 4 |
| PFP 50 0.67 | None | 0 | 17 |
| PFP 50 0.40 | Reten ® 203 | 0.1 | 72 |
| PFP 50 0.40 | Copolymer from Example 1 | 0.1 | 130 |
| PFP 50 0.40 | Reten ® 203 | 0.2 | 194 |
| PFP 50 0.40 | Copolymer from Example 1 | 0.2 | 334 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of producing sized paper with enhanced sizing property characteristics which comprises employing in the manufacture of sized paper sizing agent and a sizing enhancer that is a polymerization reaction product of monomer consisting essentially of at least one quaternary diallylammonium monomer of formula (I):

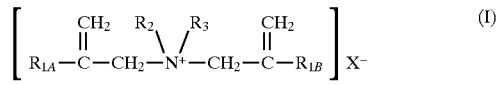

and at least one diallylammonium monomer of formula (II):

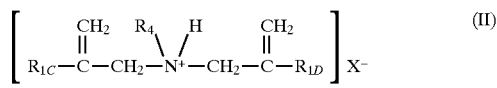

where $R_{1A}$, $R_{1B}$, $R_{1C}$ and $R_{1D}$ are independently hydrogen or $C_1-C_{22}$ straight chain or branched alkyl;

$R_2$ and $R_3$ are independently alkyl, alkenyl or aryl;

$R_4$ is hydrogen, alkyl, alkenyl or aryl; and $X^-$ is a monovalent anion or a multivalent equivalent of a monovalent anion, wherein the sizing enhancer contains about 20 to about 98 mole percent of units from the monomer of formula (I) and about 80 to about 2 mole percent of units from the monomer of formula (II) and wherein the sizing agent and size enhancer are added in amounts sufficient to produced a sized paper containing from about 0.005 wt % to about 1.5 wt % of the sizing agent, and from about 0.002 wt % to about 0.6 wt % of the sizing enhancer, based on the weight of the dried sized paper.

2. The method of claim 1 wherein, in the monomer of formula (II), $R_{1C}$ and $R_{1D}$ independently are hydrogen or methyl, and $R_4$ is selected from the group consisting of hydrogen, methyl, benzyl, phenyl, $C_2-C_{18}$ alkyl, octadecdienyl, hexadec-dienyl, octadecenyl, hexadecenyl and undecenyl.

3. The method of claim 1 wherein, in the monomers of formula (I) and formula (II), $R_{1A}$, $R_{1B}$, $R_{1C}$, $R_{1D}$ and $R_4$ are hydrogen and $R_2$ and $R_3$ are methyl.

4. The method of claim 1 wherein, in the monomers of formula (I) and formula (II), $X^-$ is a halide, nitrate, acetate, benzoate, sulfate or phosphate.

5. The method of claim 1 wherein, in the monomers of formula (I) and formula (II), $X^-$ is chloride.

6. The method of claim 1 wherein the polymerization reaction product contains from about 60 to about 95 mole percent of the units from the monomer of formula (I).

7. The method of claim 1 wherein the polymerization reaction product has a weight average molecular weight of at least about 10,000.

8. The method of claim 1 wherein the polymerization reaction product has a weight average molecular weight of at least about 50,000.

9. The method of claim 1 wherein the polymerization reaction product has a weight average molecular weight of at least about 200,000.

10. The method of claim 1 wherein the paper sizing agent is selected from the group consisting of ketene dimer, ketene multimer, acid anhydride, organic isocyanate and rosin.

11. The method of claim 10 wherein the paper sizing agent is selected from the group consisting of alkyl ketene dimer, alkenyl ketene dimer, alkyl ketene multimer and alkenyl ketene multimer.

12. The method of claim 10 wherein the paper sizing agent is an alkenyl succinic acid anhydride sizing agent.

13. The method of claim 1 wherein the paper sizing agent is selected from the group consisting of alkyl ketene dimer, alkenyl ketene dimer, alkyl ketene multimer, alkenyl ketene multimer, alkenyl succinic acid anhydride, stearic anhydride, alkyl isocyanate, alkyl carbamoyl chloride, alkylated melamine, rosin, styrene acrylate and styrene maleic anhydride.

14. The method of claim 1 wherein the sizing enhancer comprises an aqueous medium containing the polymerization reaction product.

15. The method of claim 1 further comprising employing the paper sizing enhancer in combination with the paper sizing agent as an aqueous paper sizing composition containing the paper sizing agent and the polymerization reaction product together in an aqueous medium.

16. The method of claim 1 further comprising employing the polymerization reaction product and the paper sizing agent in a respective weight ratio of from about 0.05:1 to about 4:1.

17. The method of claim 1 further comprising employing the polymerization reaction product and the paper sizing agent in a respective weight ratio of from about 0.2:1 to about 3:1.

18. The method of claim 1 wherein the paper sizing enhancer is added to a papermaking furnish used to manufacture the paper.

19. The method of claim 1 wherein the sizing enhancer is applied to the surface of the paper after the paper is formed.

20. The method of claim 1 further comprising drying the sized paper to a residual moisture level of from about 8 to about 12 wt %.

21. The method of claim 1 wherein the paper sizing agent is selected from the group consisting of alkyl ketene dimer and alkenyl ketene dimer.

22. The method of claim 1 wherein the sizing enhancer is prepared by polymerizing the monomers using a free radical polymerization initiator.

23. The method of claim 1 wherein the sizing enhancer contains about 75 to about 90 mole percent of units from the monomer of formula (I) and about 25 to about 10 mole percent of units from the monomer of formula (II).

24. The method of claim 1 wherein the at least one diallylammonium monomer of formula (II) is a secondary amine.

25. The method of claim 1 wherein the at least one diallylammonium monomer of formula (II) is a tertiary amine.

26. The method of claim 1 wherein the polymerization reaction product has a weight average molecular weight of about 200,000 to about 1,000,000.

27. The method of claim 26 wherein the sizing enhancer contains about 75 to 90 mole percent of units from the monomer of formula (I) and about 25 to about 10 mole percent of units from the monomer of formula (II).

28. The method of claim 2 wherein, in the monomer of formula (I), $R_{1A}$ and $R_{1B}$ independently are hydrogen or methyl, and $R_2$ and $R_3$ independently are selected from the group consisting of methyl, benzyl, $C_2$–$C_{18}$ alkyl, phenyl, octadec-dienyl, hexadec-dienyl, octadecenyl, hexadecenyl and undecenyl.

29. The method of claim 28 wherein, in the monomers of formula (i) and formula (II), $X^-$ is a halide, nitrate, acetate, benzoate, sulfate or phosphate.

30. The method of claim 28 wherein, in the monomer of formula (II), $R_{1C}$ and $R_{1D}$ independently are hydrogen or methyl, and $R_4$ is selected from the group consisting of hydrogen, methyl, benzyl, phenyl, $C_2$–$C_{18}$ alkyl, octadec-dienyl, hexadec-dienyl, octadecenyl, hexadecenyl and undecenyl.

31. The method of claim 30 wherein, in the monomers of formula (i) and formula (II), $X^-$ is chloride.

32. The method of claim 30 wherein the polymerization reaction product has a weight average molecular weight of at least about 10,000.

33. The method of claim 30 wherein the polymerization reaction product has a weight average molecular weight of at least about 50,000.

34. The method of claim 30 wherein the polymerization reaction product has a weight average molecular weight of at least about 200,000.

35. The method of claim 30 further comprising employing a paper sizing agent, the paper sizing agent being selected from the group consisting of ketene dimer, ketene multimer, acid anhydride, organic isocyanate and rosin.

36. The method of claim 30 further comprising employing the polymerization reaction product and a paper sizing agent in a respective weight ratio of from about 0.2:1 to about 3:1.

37. The method of claim 30 wherein, in the monomers of formula (i) and formula (II), $X^-$ is halide, nitrate, acetate, benzoate sulfate or phospate.

38. The method of claim 37 wherein polymerization reaction product contains from about 60 to about 95 mole percent of the units from the monomer of formula (I).

39. The method of claim 37 wherein the polymerization reaction product has a weight average molecular weight of at least about 50,000.

40. The method of claim 37 wherein the paper sizing agent is selected from the group consisting of alkyl ketene dimer and alkenyl ketene dimer.

41. The method of claim 37 further comprising employing a paper sizing agent, the paper sizing agent being selected from the group consisting of ketene dimer, ketene multimer, acid anhydride, organic isocyanate and rosin.

42. The method of claim 41 wherein the polymerization reaction product has a weight average molecular weight of at least about 50,000.

43. Sized paper prepared with sizing agent and a sizing enhancer that is a polymerization reaction product of monomers consisting essentially of at least one quaternary diallylammonium monomer of formula (I):

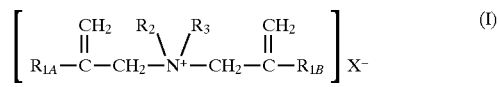

and at least one diallylammonium monomer of formula (II):

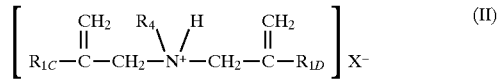

where $R_{1A}$, $R_{1B}$, $R_{1C}$ and $R_{1D}$ are independently hydrogen or $C_1$–$C_{22}$ straight chain or branched alkyl;

$R_2$ and $R_3$ are independently alkyl, alkenyl or aryl;

$R_4$ is hydrogen, alkyl, alkenyl or aryl; and $X^-$ is a monovalent anion or a multivalent equivalent of a monovalent anion, wherein the sizing enhancer contains about 20 to about 98 mole percent of units from the monomer of formula (I) and about 80 to about 2 mole percent of units from the monomer of formula (II) and wherein the amount of sizing agent and size enhancer in the sized paper is from about 0.005 wt % to about 1.5 wt %, and 0.002 wt % to about 0.6 wt % respectively, based on the weight of the dried sized paper.

44. The sized paper of claim 43 wherein the polymerization reaction product and the paper sizing agent are present in a respective weight ratio of from about 0.051:1 to about 4:1.

45. The sized paper of claim 43 wherein the polymerization reaction product and the paper sizing agent are present in a weight ratio of from about 021:1 to about 3:1.

46. The sized paper of claim 43 wherein, in the monomer of formula (I), $R_{1A}$ and $R_{1B}$ independently are hydrogen or methyl, and $R_2$ and $R_3$ independently are selected from the group consisting of methyl, benzyl, $C_2$–$C_{18}$ alkyl, phenyl, octadec-dienyl, hexedec-dienyl, octadecenyl, hexadecenyl and undecenyl.

47. The sized paper of claim 46 wherein:

in the monomer of formula (II), $R_{1C}$ and $R_{1D}$ independently are hydrogen or methyl, and $R_4$ is selected from the group consisting of hydrogen, methyl, benzyl, phenyl, $C_2$–$C_1$8 alkyl, octadec-dienyl, hexadec-dienyl, octadecenyl, hexadecenyl and undecenyl, and in the monomers of formula (I) and formula (II), $X^-$ is a halide, nitrate, acetate, benzoate, sulfate or phosphate.

48. The sized paper of claim 43 wherein, in the monomer of formula (II), $R_{1C}$ and $R_{1D}$ independently are hydrogen or methyl, and $R_4$ is selected from the group consisting of hydrogen, methyl, benzyl, phenyl, $C_2$–$C_{18}$ alkyl, octadec-dienyl, hexadec-dienyl, octadecenyl, hexadecenyl and undecenyl.

49. The sized paper of claim 43 wherein, in the monomers of formula (I) and formula (II), $R_{1A}$, $R_{1B}$, $R_{1C}$, $R_{1D}$ and $R_4$ are hydrogen and $R_2$ and $R_3$ are methyl.

50. The sized paper of claim 43 wherein, in the monomers of formula (I) and formula (II), $X^-$ is a halide, nitrate, acetate, benzoate, sulfate or phosphate.

51. The sized paper of claim 43 wherein, in the monomers of formula (I) and formula (II), $X^-$ is chloride.

52. The sized paper of claim 43 wherein the polymerization reaction product contains from about 60 to about 95 mole percent of the units from the monomer of formula (I).

53. The sized paper of claim 43 wherein the polymerization reaction product has a weight average molecular weight of at least about 10,000.

54. The sized paper of claim 43 wherein the polymerization reaction product has a weight average molecular weight of at least about 50,000.

55. The sized paper of claim 43 wherein the polymerization reaction product has a weight average molecular weight of at least about 200,000.

56. The sized paper of claim 43 wherein the paper sizing agent is selected from the group consisting of ketene dimer, ketene multimer, acid anhydride, organic isocyanate and rosin.

57. The sized paper of claim 56 wherein the paper sizing agent is selected from the group consisting of alkyl ketene dimer, alkenyl ketene dimer, alkyl ketene multimer and alkenyl ketene multimer.

58. The sized paper of claim 56 wherein the paper sizing agent is an alkenyl succinic acid anhydride sizing agent.

59. The sized paper of claim 43 wherein the paper sizing agent is selected from the group consisting of alkyl ketene dimer, alkenyl ketene dimer, alkyl ketene multimer, alkenyl ketene multimer, alkenyl succinic acid anhydride, stearic anhydride, alkyl isocyanate, alkyl carbamoyl chloride, alkylated melamine, rosin, styrene acrylate and styrene maleic anhydride.

60. The sized paper of claim 43 wherein:

in the monomer of formula (I), $R_{1A}$ and $R_1B$ independently are hydrogen or methyl, and $R_2$ and $R_3$ independently are selected from the group consisting of methyl, benzyl, $C_2$–$C_1 8$ alkyl, phenyl, octadec-dienyl, hexedec-dienyl, octadecenyl, hexadecenyl and undecenyl;

in the monomer of formula (II), $R_{1C}$ and $R_1D$ independently are hydrogen or methyl, and $R_4$ is selected from the group consisting of hydrogen, methyl, benzyl, phenyl, $C_2$–$C_1 8$ alkyl, octadec-dienyl, hexadec-dienyl, octadecenyl, hexadecenyl and undecenyl;

in the monomers of formula (i) and formula (II), $X^-$ is a halide, nitrate, acetate, benzoate, sulfate or phosphate;

the polymerization reaction product contains from about 60 to about 95 mole percent of the monomer of formula (I); and the polymerization reaction product has a weight average molecular weight of at least about 50,000.

61. The sized paper of claim 43 wherein the at least one diallylammonium monomer of formula (II) is a secondary amine.

62. The sized paper of claim 43 wherein the at least one diallylammonium monomer of formula (II) is a tertiary amine.

* * * * *